United States Patent
Takei

(10) Patent No.: US 9,041,816 B2
(45) Date of Patent: May 26, 2015

(54) OPTICAL UNIT WITH SHAKE CORRECTING FUNCTION

(75) Inventor: Yuichi Takei, Nagano (JP)

(73) Assignee: NIDEC SANKYO CORPORATION (JP)

( * ) Notice: Subject to any disclaimer, the term of this patent is extended or adjusted under 35 U.S.C. 154(b) by 43 days.

(21) Appl. No.: 14/111,452

(22) PCT Filed: Mar. 29, 2012

(86) PCT No.: PCT/JP2012/058299
§ 371 (c)(1),
(2), (4) Date: Oct. 11, 2013

(87) PCT Pub. No.: WO2012/141011
PCT Pub. Date: Oct. 18, 2012

(65) Prior Publication Data
US 2014/0028863 A1    Jan. 30, 2014

(30) Foreign Application Priority Data
Apr. 11, 2011    (JP) .................... 2011-087613

(51) Int. Cl.
*H04N 5/228*    (2006.01)
*H04M 1/02*    (2006.01)
(Continued)

(52) U.S. Cl.
CPC .............. *H04M 1/0264* (2013.01); *G03B 5/00* (2013.01); *G03B 2205/0069* (2013.01); *G03B 2205/0023* (2013.01); *H04N 5/23287* (2013.01)

(58) Field of Classification Search
CPC .............................................. G03B 2205/0023
See application file for complete search history.

(56) References Cited

U.S. PATENT DOCUMENTS

2010/0091392 A1*    4/2010    Jung et al. .................... 359/824
2012/0154614 A1*    6/2012    Moriya et al. ............. 348/208.5
(Continued)

FOREIGN PATENT DOCUMENTS

JP    08304922 A    11/1996
JP    2002207148 A    7/2002
(Continued)

OTHER PUBLICATIONS

International Search Report for International Application No. PCT/JP2012/058299; Date of Mailing: Jun. 12, 2012 with English Translation.

*Primary Examiner* — Sinh Tran
*Assistant Examiner* — Shahbaz Nazrul
(74) *Attorney, Agent, or Firm* — Cantor Colburn LLP

(57) ABSTRACT

The purpose of the present invention is to provide an optical unit with a shake correction function such that even when a photo reflector is provided by using a gap between a side surface of a movable body and a side surface of a fixed body, an appropriate relationship between an output from the photo reflector and the rock angle of the movable body can be obtained. In an optical unit (100) with a shake correction function, a movable body (3) is rocked about a rock fulcrum (180) by a driving mechanism (500) for shake correction, and thereby shaking is corrected. At that point, the movement of the movable body (3) is monitored by providing a first photo reflector (580*a*) and a second photo reflector (580*b*) on side surfaces of a fixed body (200). Here, a smooth layer (590) such as a resin tape, a metal sheet, a coating layer, plate glass or a reflective board is laminated onto side surfaces of the movable body (3) at a region facing the first photo reflector (580*a*) and a region facing the second photo reflector (580*b*).

19 Claims, 25 Drawing Sheets

(51) Int. Cl.
*G03B 5/00* (2006.01)
*H04N 5/232* (2006.01)

(56) References Cited

U.S. PATENT DOCUMENTS

2012/0250156 A1* 10/2012 Asakawa et al. ............ 359/554
2013/0128360 A1* 5/2013 Minamisawa et al. ........ 359/554
2013/0156412 A1* 6/2013 Naito et al. .................. 396/55

FOREIGN PATENT DOCUMENTS

| JP | 2007041418 A | 2/2007 |
| JP | 2009192899 A | 8/2009 |
| JP | 2010122662 A | 6/2010 |
| JP | 2010249934 A | 11/2010 |
| JP | 2011065140 A | 3/2011 |

* cited by examiner

Fig. 19(a)
Fig. 19(b)
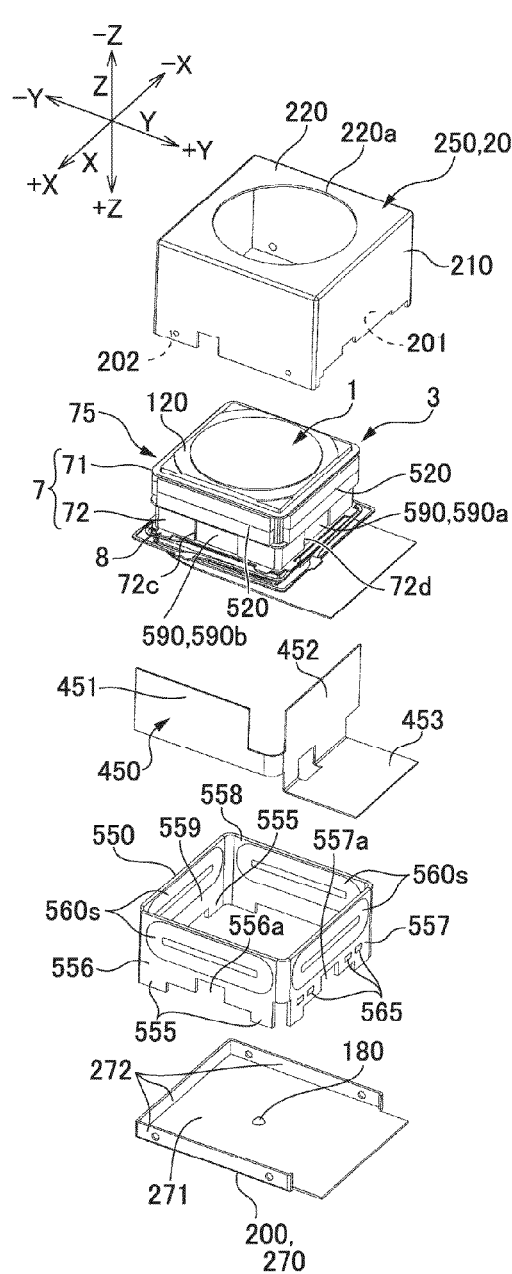
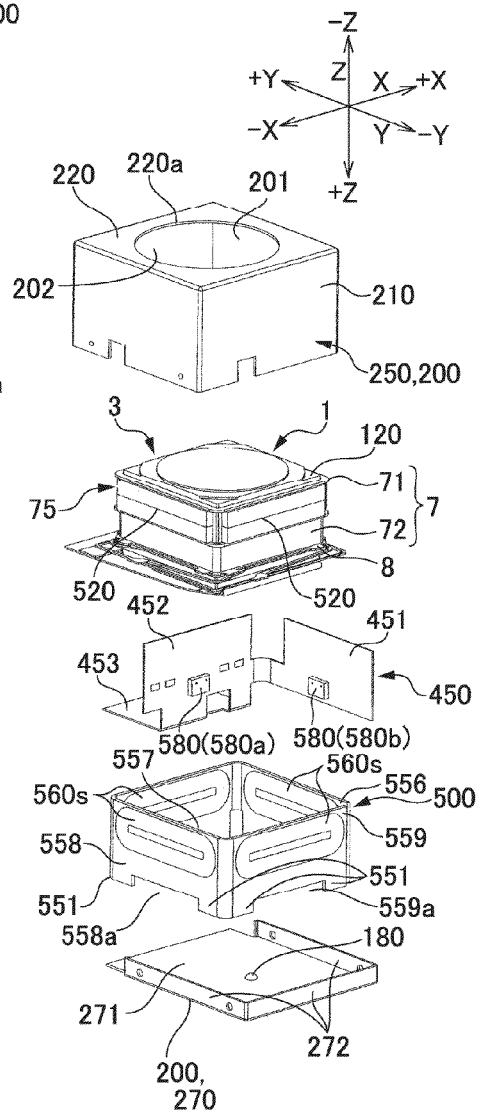

OPTICAL UNIT WITH SHAKE CORRECTING FUNCTION

CROSS REFERENCE TO RELATED APPLICATIONS

This is a U.S. national stage of International Application No. PCT/JP2012/058299, filed on Mar. 29, 2012. Priority under 35 U.S.C. §119(a) and 35 U.S.C. §365(b) is claimed from Japanese Application No. 2011-087613, filed Apr. 11, 2011, the disclosure of which is also incorporated herein by reference.

TECHNICAL FIELD

The present invention relates to an optical unit with a shake correcting function which is mounted on a cell phone with a camera or the like.

BACKGROUND

In recent years, a cell phone is structured as an optical device on which an optical unit for photographing is mounted. In the optical unit, in order to restrain disturbance of a photographed image due to a shake of hand of a user, a technique has been proposed in which an angular velocity sensor, a photo reflector and a shake correction drive mechanism are arranged in a movable body at positions adjacent to each other around a lens and, on the basis of a detection result of the angular velocity sensor due to a shake, the shake correction drive mechanism is controlled and a position of the movable body is monitored by the photo reflector (see, Patent Literature 1). Further, a structure has been also proposed in which a photo reflector is disposed at a projected portion in a radial direction from a movable body holding a lens so as to face in an optical axis direction (see Patent Literature 2). In addition, a structure has been also proposed in which an actuator and a reflection type photo interrupter (photo reflector) are arranged on a side face of a movable body holding a lens at positions adjacent to each other and a side face of a fixed body is utilized as a reflection face for the photo reflector (see Patent Literature 3).

CITATION LIST

Patent Literature

[PTL 1] Japanese Patent Laid-Open No. 2002-207148
[PTL 2] Japanese Patent Laid-Open No. 2011-65140, FIG. 1 and the like
[PTL 3] Japanese Patent Laid-Open No. 2007-41418, Paragraph [0047] and the like However, the structure described in Patent Literature 1 in which an angular velocity sensor, a photo reflector and a shake correction drive mechanism are disposed at positions adjacent to each other around a lens in a movable body has a problem that the structure is only applied to a case that the size in a direction intersecting an optical axis direction of an optical unit is large. Further, in the structure described in Patent Literature 2 in which a photo reflector facing in the optical axis direction is disposed at a projected portion in a radial direction from a movable body, a large vacant space is required around the movable body so that the photo reflector can be arranged.

On the other hand, in a case like a structure described in Patent Literature 3, in which a photo reflector is arranged by utilizing side faces facing each other of a movable body and a fixed body, a space between the side face of the movable body and the side face of the fixed body is efficiently utilized and thus, even when the size of the optical unit is reduced, the photo reflector can be arranged.

However, in a case that a photo reflector is arranged by utilizing a space between the side face of the movable body and the side face of the fixed body, there may occur a problem described below with reference to FIGS. 23(a) through 23(d) and FIGS. 24(a) and 24(b). For example, as shown in FIGS. 23(a), 23(b) and 23(c), which are a plan view, the "YZ" sectional view and the "XZ" sectional view, it is assumed that a first photo reflector 580a and a second photo reflector 580b are respectively arranged on a first side face 31 located in the "Y"-axis direction (first direction) and a second side face 32 located in the "X"-axis direction (second direction) in the movable body 3, and that a first side face 201 of the fixed body 200 is utilized as a reflection face for the first photo reflector 580a and the second side face 202 of the fixed body 200 is utilized as a reflection face for the second photo reflector 580b. In an assumptive case that the above-mentioned structure is adopted, when the movable body 3 is turned around an axial line "Y0" with the swing support point 180 as a turning center, an output from the first photo reflector 580a and an output from the second photo reflector 580b are respectively varied as shown by the solid line "L1y" and the dotted line "L2y" in FIG. 24(a). Further, when the movable body 3 is turned around an axial line "X0" with the swing support point 180 as a turning center (see FIG. 23(d)), an output from the first photo reflector 580a and an output from the second photo reflector 580b are respectively varied as shown by the solid line "L1x" and the dotted line "L2x" in FIG. 24(b). In this case, when the movable body 3 is swung, the position of the fixed body 200 facing the first photo reflector 580a and the position facing the second photo reflector 580b are moved largely. Therefore, in a case that there is a scratch or the like on a part of a region facing the first photo reflector 580a and a part of a region facing the second photo reflector 580b, malfunction occurs in the output from the first photo reflector 580a and the output from the second photo reflector 580b. For example, in a case that a scratch 299 or the like (damage) is existed on a part of the region where the position facing the first photo reflector 580a is moved when the movable body 3 is swung around the axial line "X0", linearity of the output from the first photo reflector 580a with respect to a swing angle of the movable body 3 is deteriorated as shown by the solid line "L1x" in FIG. 24(b). As a result, displacement of the movable body 3 is not detected with a high degree of accuracy and thus the swing of the movable body 3 is unable to be controlled with a high degree of accuracy. On the other hand, in order to set the entire region facing the first photo reflector 580a and the second photo reflector 580b to be a smooth surface at the time of swinging of the movable body 3, working such as polishing is required and thus cost is increased. Further, even when the entire region facing the first photo reflector 580a and the second photo reflector 580b at the time of swinging of the movable body 3 is worked to be a smooth surface, it is difficult that the first side face 201 and the second side face 202 of the fixed body 200 are completely prevented from being scratched and damaged when the optical unit 100 is to be assembled.

The above-mentioned problems may occur also in a case that the first photo reflector 580a and the second photo reflector 580b are arranged on the first side face 201 and the second side face 202 of the fixed body 200 and regions of the first side face 31 and the second side face 32 of the movable body 3 facing the first photo reflector 580a and the second photo reflector 580b are utilized as reflection faces.

On the other hand, in a case that a photo reflector is arranged by utilizing a space between the movable body 3 and the fixed body 200, when a space between a bottom part 39 (rear side end part in the optical axis direction) of the movable body 3 and a bottom part 209 of the fixed body 200 is utilized as shown in FIGS. 25(*a*), 25(*b*) and 25(*c*), which are respectively a plan view, the "YZ" sectional view and the "XZ" sectional view, the problems described with reference to FIGS. 23(*a*) through 23(*d*) and FIGS. 24(*a*) and 24(*b*) are hardly occurred. In other words, in a case that the first photo reflector 580*a* and the second photo reflector 580*b* are arranged on the bottom part 39 (rear side end part in the optical axis direction) of the movable body 3 as shown in FIGS. 25(*a*) through 25(*d*), even when the movable body 3 is swung (see FIG. 25(*d*)), a moving amount of the region where the first photo reflector 580*a* faces and a moving amount of the region where the second photo reflector 580*b* faces are extremely small and thus, linearity of the output from the first photo reflector 580*a* and linearity of the output from the second photo reflector 580*b* with respect to a swing angle of the movable body 3 are hardly lowered.

Therefore, the problem described with reference to FIGS. 23(*a*) through 23(*d*) and FIGS. 24(*a*) and 24(*b*) is specific to a case that photo reflectors are provided by utilizing a space between the side face of the movable body 3 and the side face of the fixed body 200. However, in a case of the structure shown in FIG. 25(*a*) through 25(*d*), when the swing support point 180 is provided, a space between the bottom part 39 of the movable body 3 and the bottom part 209 of the fixed body 200 is large and thus a problem may occur that sensitivity of a photo reflector is lowered or the like. Further, in a case of the structure shown in FIG. 25(*a*) through 25(*d*), excessive restrictions are imposed for disposing a flexible wiring board between the bottom part 39 of the movable body 3 and the bottom part 209 of the fixed body 200. Therefore, it is preferable that, as described with reference to FIGS. 23(*a*) through 23(*d*), a photo reflector is provided by utilizing a space between the side face of the movable body 3 and the side face of the fixed body 200 and, in addition, linearity of an output from the first photo reflector 580*a* and linearity of an output from the second photo reflector 580*b* are improved.

SUMMARY

In view of the problem described above, at least an embodiment of the present invention is to provide an optical unit with a shake correcting function in which appropriate correlation between an output from the photo reflector and a swing angle of the movable body is obtained even when the photo reflector is provided by utilizing a space between a side face of the movable body and a side face of the fixed body.

In order to attain the above, at least an embodiment of the present invention provides an optical unit with a shake correcting function including a fixed body, a movable body which holds an optical element, a shake correction drive mechanism structured to swing the movable body in a first direction intersecting an optical axis direction and in a second direction intersecting the optical axis direction and the first direction, a first photo reflector which is provided on a first side face that is one of a first side face of the fixed body and a first side face of the movable body facing each other in the first direction, the first photo reflector being directed to the other of the first side face of the fixed body and the first side face of the movable body, a first reflective smooth layer which is superposed on the other of the first side faces in a region facing the first photo reflector, a second photo reflector which is provided on a second side face that is one of a second side face of the fixed body and a second side face of the movable body facing each other in the second direction, the second photo reflector being directed to the other of the second side face of the fixed body and the second side face of the movable body, and a second reflective smooth layer which is superposed on the other of the second side faces in a region facing the second photo reflector.

The optical unit with a shake correcting function in accordance with at least an embodiment of the present invention is provided with a shake correction drive mechanism structured to swing the movable body. Therefore, when a shake such as a shake of hand is occurred in the optical unit, the movable body can be swung to cancel the shake. Accordingly, even when the optical unit is shaken, an inclination of the optical axis can be corrected. Further, a photo reflector (first photo reflector and second photo reflector) is provided between a side face of the movable body and a side face of the fixed body and thus displacement of the movable body is monitored by the photo reflector and the shake correction drive mechanism can be controlled on the basis of a monitored result. On the side face of the fixed body and the side face of the movable body, a reflective smooth layer (first smooth layer and second smooth layer) is superposed in a region facing the photo reflector (first photo reflector and second photo reflector) and thus, even when the movable body is swung, the photo reflector always faces the smooth layer. Therefore, even when there is a scratch or the like in a region facing the photo reflector, the scratch is covered by the reflective smooth layer and thus appropriate reflected light is always returned to the photo reflector. Accordingly, even when the photo reflector is provided by utilizing a space between the side face of the movable body and the side face of the fixed body, appropriate correlation can be obtained between an output from the photo reflector and a swing angle of the movable body and a swing of the movable body can be monitored with a high degree of accuracy.

In at least an embodiment of the present invention, it may be structured that each of the first smooth layer and the second smooth layer is made of one of a resin tape, a metal sheet, coating layer, a plate-shaped glass and a reflection plate. According to this structure, the smooth layer can be provided in the middle or the final stage of assembling of the optical unit and thus the smooth layer is prevented from being scratched in the middle of assembling of the optical unit.

In at least an embodiment of the present invention, it is preferable that each of the first smooth layer and the second smooth layer is superposed on a flat face. According to this structure, the smooth layer can be superposed appropriately.

In at least an embodiment of the present invention, it may be structured that the first photo reflector and the second photo reflector are provided on the fixed body and the first smooth layer and the second smooth layer are provided on the movable body.

In at least an embodiment of the present invention, it is preferable that the shake correction drive mechanism includes a first air-core coil provided on the first side face of the fixed body, a first magnet provided on the first side face of the movable body, a second air-core coil provided on the second side face of the fixed body, and a second magnet provided on the second side face of the movable body, and the first photo reflector is provided in an inner side region of the first air-core coil, the second photo reflector is provided in an inner side region of the second air-core coil, the first smooth layer is superposed on a face of the first magnet on a side where the first air-core coil is located, and the second smooth layer is superposed on a face of the second magnet on a side where the second air-core coil is located. According to this structure, the first photo reflector and the second photo reflector are provided in free spaces, i.e., an inner side region of the first air-core coil and an inner side region of the second air-core coil which are used in the shake correction drive mechanism. Therefore, even when the first photo reflector and the second photo reflector are provided, increase of sizes in the optical axis direction and a direction intersecting the optical axis direction of the optical unit can be prevented. In addition, the first photo reflector and the second photo reflector are provided in an inner side region of the first air-core coil and an inner side region of the second air-core coil and are surrounded by the first air-core coil and the second air-core coil. Therefore, light emitted from one of the first photo reflector and the second photo reflector is prevented from being incident on the other photo reflector as a leaked light by the first air-core coil and the second air-core coil. Accordingly, the photo reflector can be prevented from erroneous detecting due to a leaked light and thus inclination of the optical axis can be corrected with a high degree of accuracy.

In at least an embodiment of the present invention, it is preferable that the first photo reflector is provided at a position displaced to a side where the first magnet is located with respect to a back face of the first air-core coil in the inner side region of the first air-core coil, and the second photo reflector is provided at a position displaced to a side where the second magnet is located with respect to a back face of the second air-core coil in the inner side region of the second air-core coil. According to this structure, a distance between the photo reflector and the magnet can be set smaller and thus sensitivity of the photo reflector is improved.

In at least an embodiment of the present invention, it is preferable that the shake correction drive mechanism includes a first coil provided on the first side face of the fixed body, a first magnet provided on the first side face of the movable body, a second coil provided on the second side face of the fixed body, and a second magnet provided on the second side face of the movable body, and the first photo reflector, the first smooth layer, the second photo reflector and the second smooth layer are provided on a side where a swing center of the movable body is located in the optical axis direction with respect to the first coil, the first magnet, the second coil and the second magnet. According to this structure, in order to swing the movable body with a sufficient torque, it is preferable that the shake correction drive mechanism is provided at a position separated from the swing support point in the optical axis direction. Further, judging from a viewpoint of linearity between distance and output of the photo reflector, it is preferable that detection is performed under a condition that displacing amount is to some extent small. Therefore, when the photo reflector is provided between the shake correction drive mechanism and the swing center which are provided at the positions separated from each other in the optical axis direction, the photo reflector is provided at a position where displacement of the movable body is relatively small. Accordingly, even when the size of the optical unit is small, both of the shake correction drive mechanism and the photo reflector can be disposed appropriately.

In at least an embodiment of the present invention, it is preferable that the optical unit includes a swing support point which supports a rear side end part in the optical axis direction of the movable body so that the movable body is capable of swinging in the first direction and the second direction. In a case that this structure is adopted, a space between a rear end part in the optical axis direction of the movable body and the bottom part of the fixed body is widened. However, according to at least an embodiment of the present invention, the photo reflector is provided by utilizing a space between a side face of the movable body and a side face of the fixed body. Therefore, in comparison with a case that a photo reflector is provided between a rear side end part in the optical axis direction of the movable body and the bottom parts of the fixed body, the photo reflector can be used with a high degree of sensitivity.

In the optical unit with a shake correcting function in accordance with at least an embodiment of the present invention, a photo reflector (first photo reflector and second photo reflector) is provided between a side face of the movable body and a side face of the fixed body and thus displacement of the movable body is monitored by the photo reflector and the shake correction drive mechanism can be controlled on the basis of a monitored result. On a side face of the fixed body and a side face of the movable body, a reflective smooth layer (first smooth layer and second smooth layer) is superposed in a region facing the photo reflector (first photo reflector and second photo reflector) and thus, even when the movable body is swung, the photo reflector always faces the smooth layer. Therefore, even when there is a scratch or the like in a region facing the photo reflector, the scratch is covered by the reflective smooth layer and thus appropriate reflected light is always returned to the photo reflector. Accordingly, even when the photo reflector is provided by utilizing a space between the side face of the movable body and the side face of the fixed body, appropriate correlation can be obtained between an output from the photo reflector and a swing angle of the movable body and a swing of the movable body can be controlled with a high degree of accuracy.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 19(a) and 19(b) are exploded perspective views showing a part of an optical unit with a shake correcting function in accordance with a second embodiment of the present invention.

DESCRIPTION OF EMBODIMENTS

Embodiments of the present invention will be described below with reference to the accompanying drawings. In the following descriptions, a structure for preventing a shake of hand to a photographing unit will be described as an example for an optical unit. Further, in the following descriptions, three directions perpendicular to each other are set to be an "X"-axis, a "Y"-axis and a "Z"-axis and a direction along an optical axis "L" (lens optical axis) is set to be the "Z"-axis. Further, in the following descriptions, in swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

[First Embodiment]

(Entire Structure of Optical Unit for Photographing)

Figure 1:
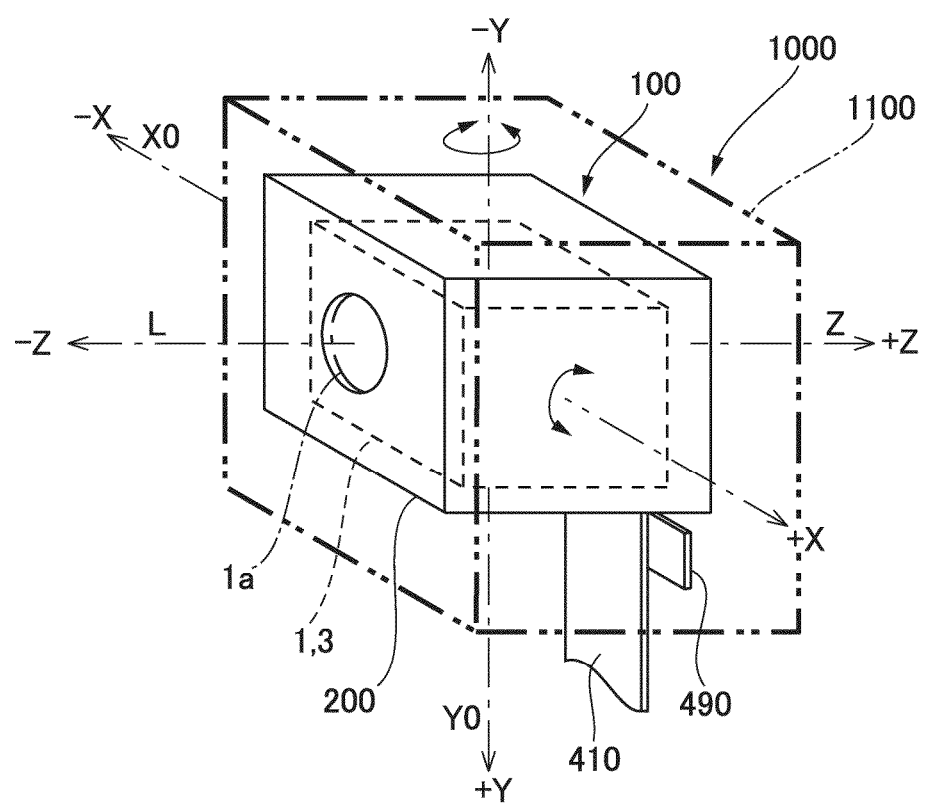
FIG. 1 is an explanatory view schematically showing a state in which an optical unit with a shake correcting function to which at least an embodiment of the present invention is applied is mounted on an optical device such as a cell phone.
Figure 2A:
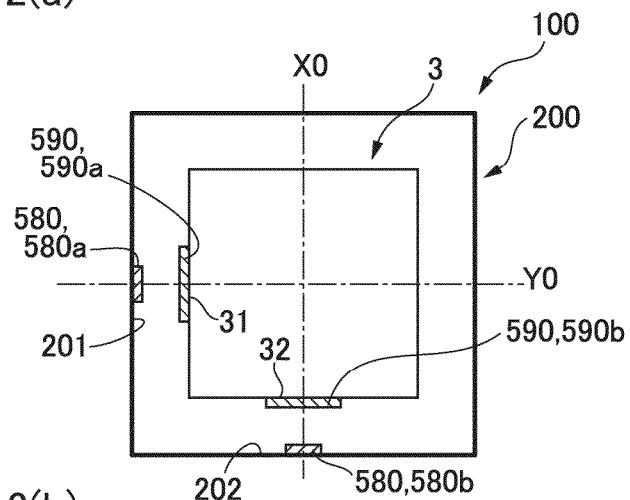
FIGS. 2(a) through 2(d) are explanatory views showing disposing positions of photo reflectors and the like in an optical unit with a shake correcting function to which at least an embodiment of the present invention is applied.
Figure 2B:
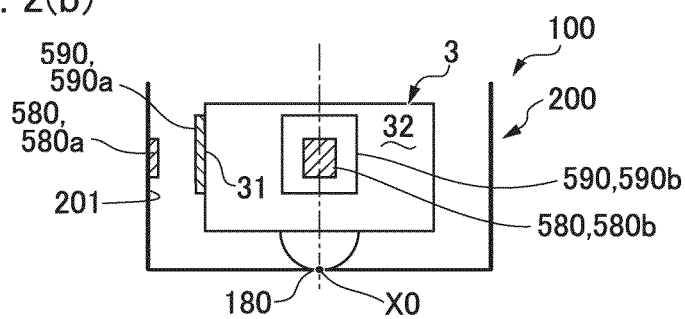
Figure 2C:
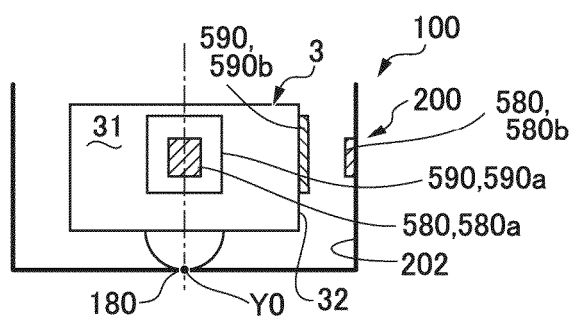
Figure 2D:
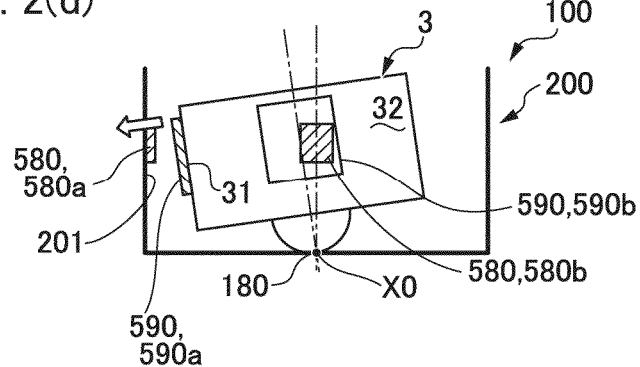

FIG. 1 is an explanatory view schematically showing a state in which an optical unit with a shake correcting function to which at least an embodiment of the present invention is applied is mounted on an optical device such as a cell phone. FIGS. 2(a) through 2(d) are explanatory views showing disposing positions of photo reflectors and the like in an optical unit with a shake correcting function to which at least an embodiment of the present invention is applied. FIG. 2(a) is an explanatory view showing a planer structure of the optical unit, FIG. 2(b) is an explanatory view schematically showing its "YZ" cross section, FIG. 2(c) is an explanatory view schematically showing its "XZ" cross section, and FIG. 2(d) is an explanatory view schematically showing a state that a movable body is swung. In FIG. 1 and FIGS. 2(a) through 2(d), a shake correction drive mechanism is not shown.

An optical unit 100 (optical unit with a shake correcting function) shown in FIG. 1 is a thin camera used in an optical device 1000 such as a cell phone with a camera and is mounted in a supported state by a chassis 1100 (device main body) of the optical device 1000. In the optical unit 100, when a shake such as a shake of hand is occurred in the optical device 1000 at the time of photographing, disturbance occurs in a photographed image. In order to prevent this problem, the optical unit 100 in this embodiment is, as described below, provided with a shake correction drive mechanism (not shown in FIG. 1) which swingably supports a movable body 3 including a photographing unit 1 within a fixed body 200 and swings the photographing unit 1 on the basis of a detection result of a shake of hand by a shake detection sensor such as a gyroscope mounted on the optical unit 100 or a gyroscope mounted on the main body side of the optical device 1000.

In this embodiment, as shown in FIGS. 2(a), 2(b) and 2(c), a photo reflector 580 (first photo reflector 580a and second photo reflector 580b) is provided which monitors displacement of the movable body 3 when the optical unit 100 is swung. Therefore, the shake correction drive mechanism is controlled on the basis of a monitored result by the photo reflector 580. In order to provide the photo reflector 580, in this embodiment, one of first side faces of a first side face 201 of the fixed body 200 and a first side face 31 of the movable body 3 facing each other in the "Y" direction (first direction) is provided with a first photo reflector 580a which faces the other of the first side faces. Further, a second photo reflector 580b is provided on one of second side faces of a second side face 202 of the fixed body 200 and a second side face 32 of the movable body 3 facing each other in the "X" direction (second direction) so as to face the other of the second side faces. More specifically, in this embodiment, the first photo reflector 580a is provided on the first side face 201 of the fixed body 200 and the first photo reflector 580a is directed to the first side face 31 of the movable body 3. Further, the second photo reflector 580b is provided on the second side face 202 of the fixed body 200 and the second photo reflector 580b is directed to the second side face 32 of the movable body 3.

In this embodiment, a first reflective smooth layer 590a is superposed on the first side face 31 of the movable body 3 in a region facing the first photo reflector 580a and a second reflective smooth layer 590b is superposed on the second side face 32 of the movable body 3 in a region facing the second photo reflector 580b. The smooth layer 590 (first smooth layer 590a and second smooth layer 590b) is made of a resin tape, a metal sheet, coating layer, a plate-shaped glass or a reflection plate. More specifically, the smooth layer 590 is made of a resin tape, a metal sheet, a plate-shaped glass or a reflection plate, which is adhesively fixed to the movable body 3 by adhesive material or the like, or made of coating layer which is cured after being coated on the movable body 3.

In the optical unit 100 structured as described above, a region facing the photo reflector 580 is moved with swing of the movable body 3 but the smooth layer 590 is provided over the entire region facing the photo reflector 580 when the movable body 3 is swung. Therefore, for example, even when the movable body 3 is turned around the axial line "X0" as shown in FIG. 2(d), the first photo reflector 580a always faces the first smooth layer 590a and the second photo reflector 580b always faces the second smooth layer 590b. Further, though not shown, also when the movable body 3 is turned around the axial line "Y0", similarly to the case that the movable body 3 is turned around the axial line "X0", the first photo reflector 580a always faces the first smooth layer 590a and the second photo reflector 580b always faces the second smooth layer 590b.

(Specific Structural Example of Optical Unit 100)

Figure 3A:
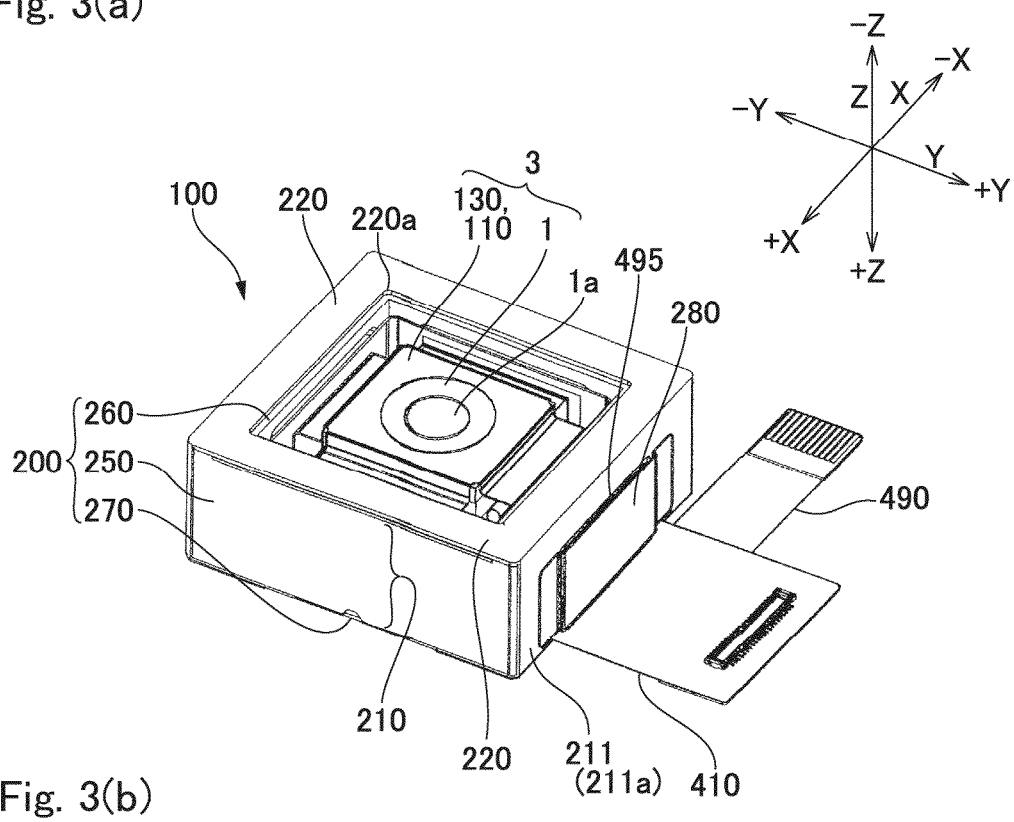
FIGS. 3(a) and 3(b) are perspective views showing outward appearance of an optical unit with a shake correcting function and the like in accordance with a first embodiment of the present invention.
Figure 3B:
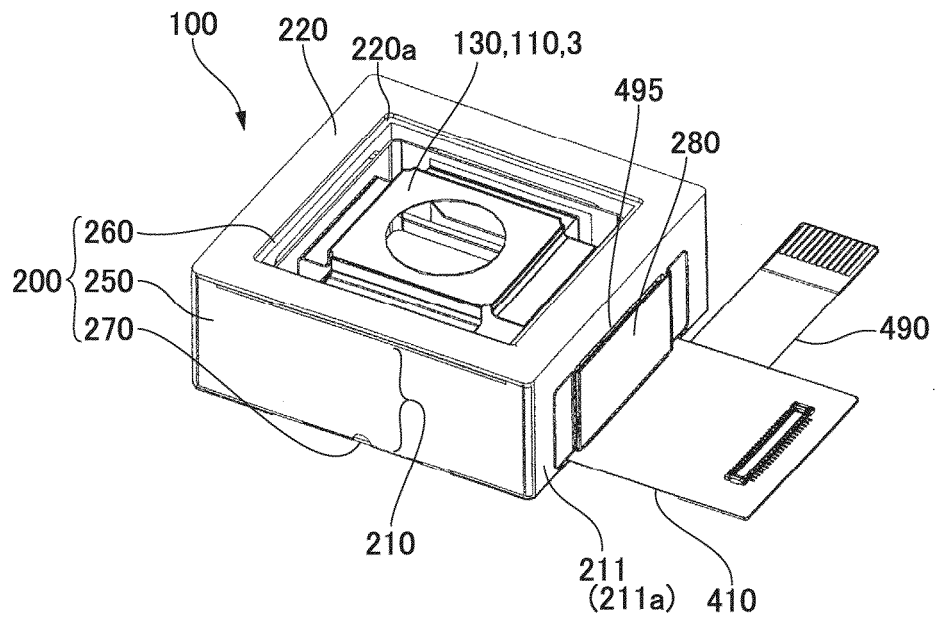
Figure 4:
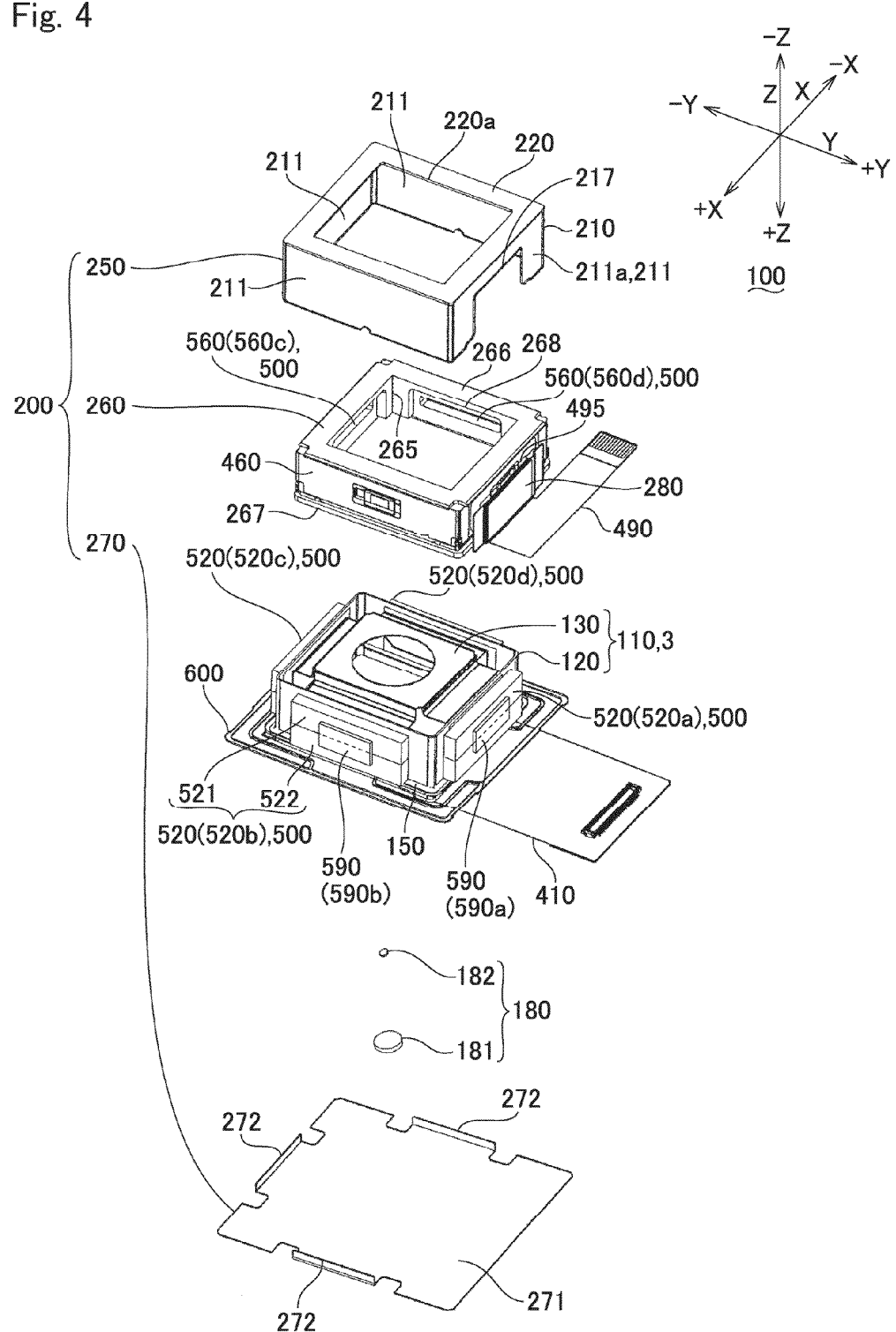
FIG. 4 is an exploded perspective view showing an entire structure of an optical unit with a shake correcting function in accordance with a first embodiment of the present invention.

FIGS. 3(a) and 3(b) are perspective views showing outward appearance of an optical unit with a shake correcting function and the like in accordance with a first embodiment of the present invention. FIG. 3(a) is a perspective view showing the optical unit which is viewed from an object side and FIG. 3(b) is a perspective view showing a state that a photographing unit is detached from the optical unit. FIG. 4 is an exploded perspective view showing an entire structure of the optical unit 100 with a shake correcting function in accordance with the first embodiment of the present invention. In FIG. 4, only a case 110 of the movable body 3 is shown and the photographing unit 1 is not shown.

As shown in FIG. 1, FIGS. 3(a) and 3(b), and FIG. 4, flexible wiring boards 410 and 490 for performing power feeding to the photographing unit 1 and a shake correction drive mechanism are extended from the optical unit 100, and the flexible wiring boards 410 and 490 are electrically connected with a host control part which is provided on a main body of the optical device 1000. Further, the flexible wiring board 410 is also provided with a function for outputting a signal from the photographing unit 1.

In FIGS. 3(a) and 3(b) and FIG. 4, the optical unit 100 includes the fixed body 200, the movable body 3 in which the photographing unit 1 is accommodated within the case 110, a spring member 600 through which the movable body 3 is supported so as to be capable of being displaced with respect to the fixed body 200, and a shake correction drive mechanism 500 which generates a magnetic drive force for relatively displacing the movable body 3 with respect to the fixed body 200 between the movable body 3 and the fixed body 200.

(Structure of Fixed Body 200)

Figure 5:
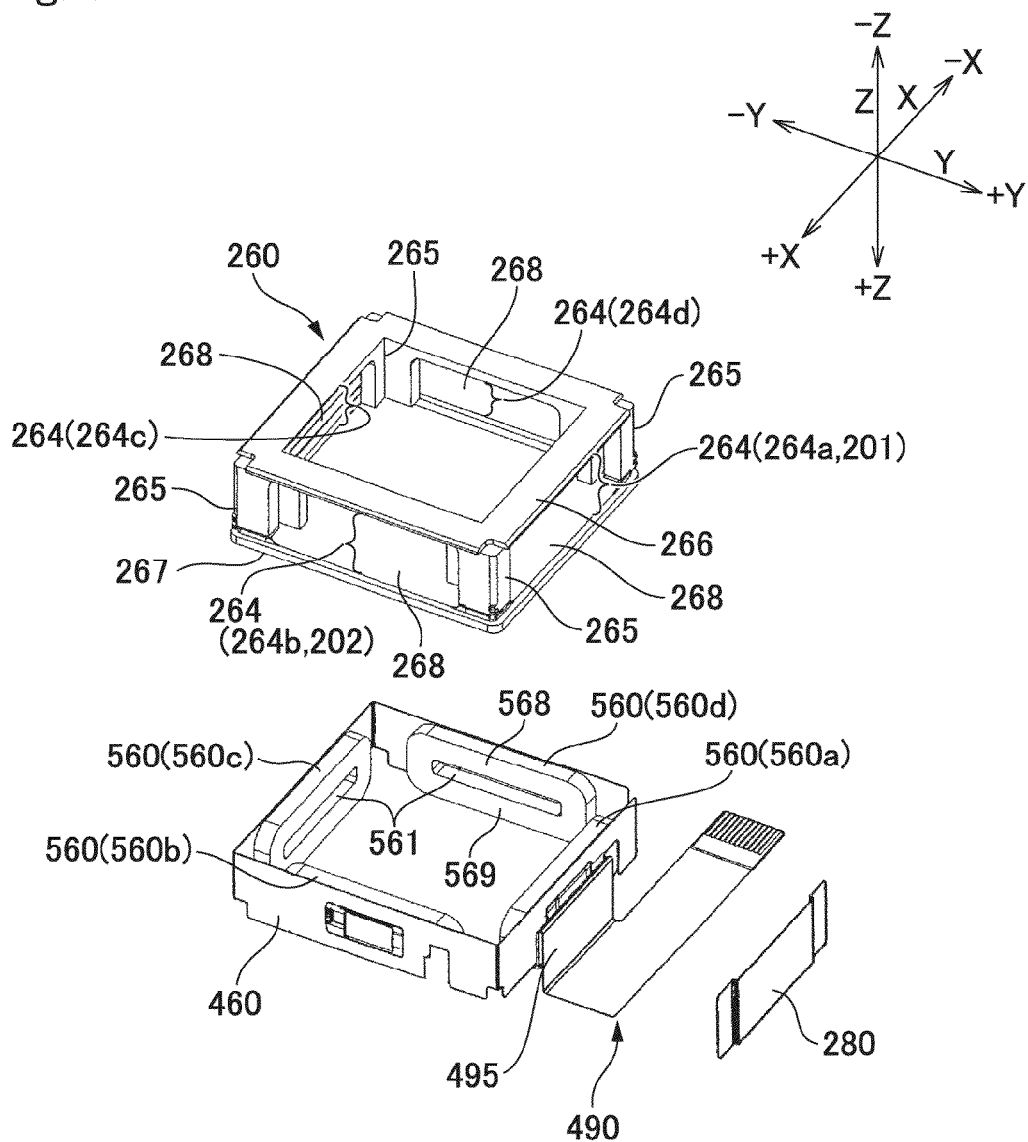
FIG. 5 is an explanatory view showing a coil holder and coils which are used in an optical unit with a shake correcting function in accordance with a first embodiment of the present invention.
Figure 6:
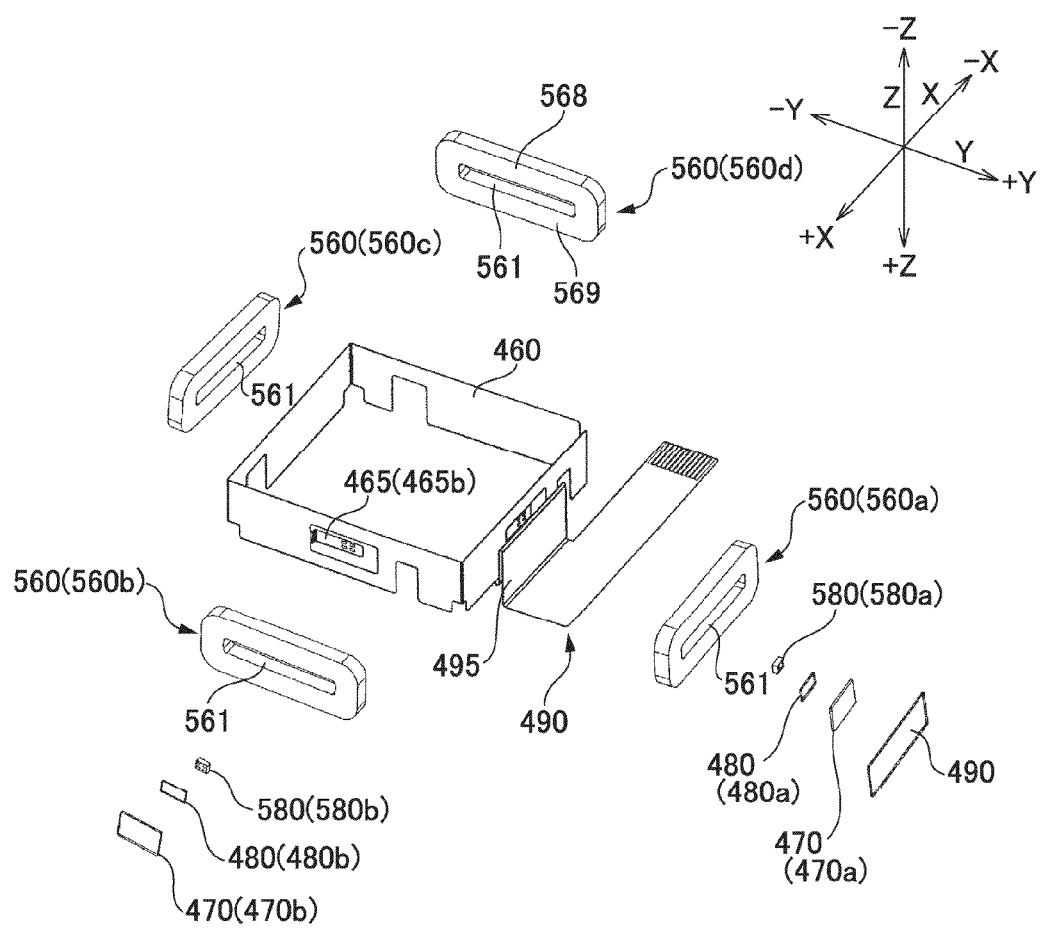
FIG. 6 is an explanatory view showing flexible wiring boards in an optical unit with a shake correcting function in accordance with a first embodiment of the present invention.

FIG. 5 is an explanatory view showing a coil holder and coils which are used in the optical unit 100 with a shake correcting function in accordance with the first embodiment of the present invention. FIG. 6 is an explanatory view showing the flexible wiring board 490 in the optical unit 100 with a shake correcting function in accordance with the first embodiment of the present invention.

As shown in FIGS. 3(a) and 3(b) and FIG. 4, the fixed body 200 includes an upper cover 250, a coil holder 260 and a lower cover 270. The upper cover 250 is provided with a rectangular tube shaped body part 210 surrounding the movable body 3 and an end plate part 220 which closes an opening part on an object to be photographed side of the rectangular tube shaped body part 210. The end plate part 220 is formed with a window 220a through which light from an object to be photographed is incident. The upper cover 250 is structured so that an end part of the rectangular tube shaped body part 210 on an opposite side ("+Z" side) to an object to be photographed side (side to which the optical axis "L" is extended) is formed to be an open end. In the rectangular tube shaped body part 210 of the upper cover 250, a cut-out part 217 is formed in a side plate part 211a which is located on one side "+Y" in the "Y"-axis direction among four side plate parts 211. The cut-out part 217 is utilized for extending the flexible wiring boards 410 and 490 to the outside.

The lower cover 270 is a press-formed product which is made of a metal plate and is provided with a bottom plate part 271 having a roughly rectangular shape and three side plate parts 272 comprised of two sides facing in the "X"-axis direction and one side located on the other side "−Y" in the "Y"-axis direction among outer circumferential edges of the bottom plate part 271. The side plate parts 272 are fixed to an inner face of the rectangular tube shaped body part 210 of the upper cover 250.

In the lower cover 270, a support plate 181 is fixed to a center of its upper face which is directed to a front side in the optical axis direction and the bottom part (rear side end part in the optical axis direction) of the movable body 3 is fixed with a protruded part 182 having a hemispherical shape. The protruded part 182 structures a swing support point 180, which swingably supports the movable body 3, and the movable body 3 can be swung with an end part (swing support point 180) which is located on one side "+Z" of the "Z"-axis (rear side in the optical axis direction) as a swing center. Therefore, the movable body 3 is capable of swinging with a rear side in the optical axis direction ("+Z" side in the "Z"-axis direction) as a swing center with respect to the center in the optical axis direction. In accordance with an embodiment of the present invention, in order to structure the swing support point 180, a structure may be adopted that a hemispheric projection is provided on a side of the lower cover 270, or that a steel ball is disposed between the lower cover 270 and the movable body 3.

As shown in FIG. 5, the coil holder 260 is formed in a rectangular shape which is provided with vertical frame portions 265 having "L"-shaped transverse cross-section, which are extended in the optical axis direction at respective four corner portions, an upper frame portion 266 which connects adjacent vertical frame portions 265 with each other on a front side in the optical axis direction, and a lower frame portion 267 which connects adjacent vertical frame portions 265 with each other on a rear side in the optical axis direction. The vertical frame portion 265 is located on a slightly inner side with respect to an outer circumferential edge of the upper frame portion 266 and an outer circumferential edge of the lower frame portion 267. The coil holder 260 is structured of side faces 264 in which an opening part 268 is formed between adjacent vertical frame portions 265.

A belt-shaped portion 460 of the flexible wiring board 490 shown in FIGS. 5 and 6 is held around the coil holder 260 in a bent state in a rectangular shape and an air-core coil 560 is mounted on an inner face of the belt-shaped portion 460 at respective four positions separated from each other in the longitudinal direction. The air-core coil 560 is formed in a quadrangular frame shape, and long side portions 568 and 569 located on upper and lower sides facing in the optical axis direction are utilized as an effective side. The belt-shaped portion 460 is bent in a rectangular shape along the circumference of the coil holder 260 and is held by the coil holder 260 in an accommodated state between the upper frame portion 266 and the lower frame portion 267 in the optical axis direction. In this state, the upper and the lower long side portions 568 and 569 of four air-core coils 560 are exposed on an inner side through the opening part 268 of the coil holder 260.

The four air-core coils 560 are hereinafter referred to as a first air-core coil 560a, a second air-core coil 560b, a third air-core coil 560c and a fourth air-core coil 560d in a disposed order around the optical axis. Further, four side faces 264 of the coil holder 260 are hereinafter referred to as side faces 264a, 264b, 264c and 264d in a disposed order around the optical axis. In these side faces, the side face 264a corresponds to a first side face 201 of the fixed body 200 and the side face 264b corresponds to a second side face 202 of the fixed body 200.

In the flexible wiring board 490, a bent portion 495 which is bent in the optical axis direction is provided at a root portion of the belt-shaped portion 460, and the bent portion 495 is disposed so as to close the cut-out part 217 of the upper cover 250 (see FIG. 4). Further, a board cover 280 made of a metal plate is covered on an outer side of the bent portion 495 and both end portions of the base cover 280 are fixed to the side plate part 211a of the upper cover 250.

Specifically, as described below, the belt-shaped portion 460 of the flexible wiring board 490 shown in FIGS. 5 and 6 is mounted with photo reflectors 580 (first photo reflector 580a and second photo reflector 580b) so as to direct two directions intersecting the optical axis direction. The photo reflector 580 is held by the fixed body 200 so that displacement of the movable body 3 is detected to control the shake correction drive mechanism 500 described below.

(Structure of Movable Body 3)

Figure 7:
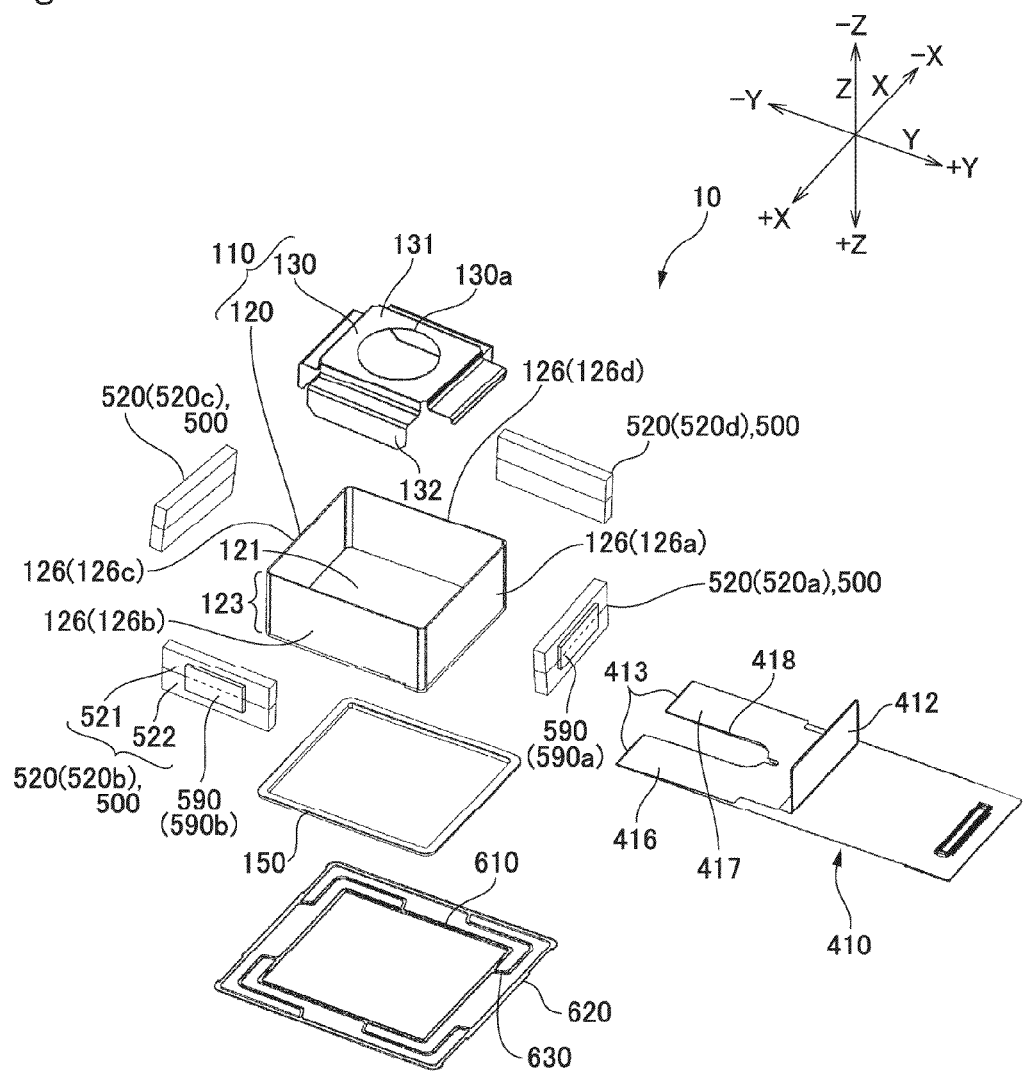
FIG. 7 is an exploded perspective view showing a movable body which is used in an optical unit with a shake correcting function in accordance with a first embodiment of the present invention.

FIG. 7 is an exploded perspective view showing the movable body 3 which is used in the optical unit 100 with a shake correcting function in accordance with the first embodiment of the present invention. In FIG. 7, the photographing unit 1 is not shown.

As shown in FIG. 7, the movable body 3 includes a case 110 which holds the photographing unit 1 shown in FIG. 3(a) in its inside and the case 110 structures an outer peripheral portion of the movable body 3. The case 110 is comprised of a tube-shaped case 120 which covers around the photographing unit 1 and an upper case 130 which covers a front side of the photographing unit 1 in the optical axis direction. The tube-shaped case 120 is a press-formed product of a metal plate and, in this embodiment, the tube-shaped case 120 is provided with a rectangular tube part 123 and a bottom part 121. In the tube-shaped case 120, the rectangular tube part 123 structures a side face part of the movable body 3. In this embodiment, the movable body 3 is formed in a rectangular parallelepiped shape and the tube-shaped case 120 has a rectangular tube shape. The upper case 130 is formed in a roughly quadrangular shape. The upper case 130 is provided with an upper plate part 131, which covers a front side of the tube-shaped case 120 in the optical axis direction, and side plate parts 132 which are protruded to a rear side in the optical axis direction from an outer circumferential edge of the upper plate part 131. The upper plate part 131 is formed with a hole 130a for passing light from an object to be photographed side. Further, the side plate part 132 is bent in an "L" shape toward the rear side in the optical axis direction and is fitted into an inside of the tube-shaped case 120 to connect the upper case 130 with the tube-shaped case 120.

A spring member 600 is connected with the tube-shaped case 120. The spring member 600 is a plate-shaped spring member, which is provided with a fixed body side connection part 620, which is fixed to a lower end part of the coil holder 260 of the fixed body 200, a movable body side connection part 610 which is connected with the movable body 3, and a plurality of arm parts 630 which are extended between the movable body side connection part 610 and the fixed body side connection part 620. Both ends of the arm part 630 are respectively connected with the movable body side connection part 610 and the fixed body side connection part 620. The spring member 600 is made of nonmagnetic metal such as beryllium copper or nonmagnetic SUS steel material and is formed by performing press working or etching processing using photo lithography technique on a thin plate having a certain thickness. In this embodiment, the movable body side connection part 610 and the fixed body side connection part 620 are formed in a rectangular frame shape and the fixed body side connection part 620 is fixed to an under face of a lower frame portion 267 of the coil holder 260 of the fixed body 200 over its entire periphery. Further, the movable body side connection part 610 is fixed to an outer peripheral face of the tube-shaped case 120 of the movable body 3 over its entire periphery. However, in accordance with an embodiment of the present invention, it may be structured that the movable body side connection part 610 and the fixed body side connection part 620 are divided so as to correspond to the respective arm parts 630.

Each of four side faces 126 of the tube-shaped case 120 is fixed with a magnet 520 which structures the shake correction drive mechanism 500 together with the air-core coil 560 which is described with reference to FIGS. 4, 5 and 6. An outer face side and an inner face side of the magnet 520 are magnetized to be different poles from each other. Further, the magnet 520 is comprised of two magnet pieces (first magnet piece 521 and second magnet piece 522) which are adjacent to each other in the optical axis direction and two magnet pieces are disposed so that the poles of their inner faces are magnetized to be different from each other.

Hereinafter, four magnets 520 are referred to as a first magnet 520a, a second magnet 520b, a third magnet 520c and a fourth magnet 520d in a disposing order around the optical axis. Further, four side faces 126 of the tube-shaped case 120 are referred to as side faces 126a, 126b, 126c and 126d in a disposing order around the optical axis. Among these side faces, the side face 126a corresponds to the first side face 31 of the movable body 3 and the side face 126b corresponds to the second side face 32 of the movable body 3.

(Fixing Structure of Spring Member 600 to Movable Body 3)

Figure 8A:
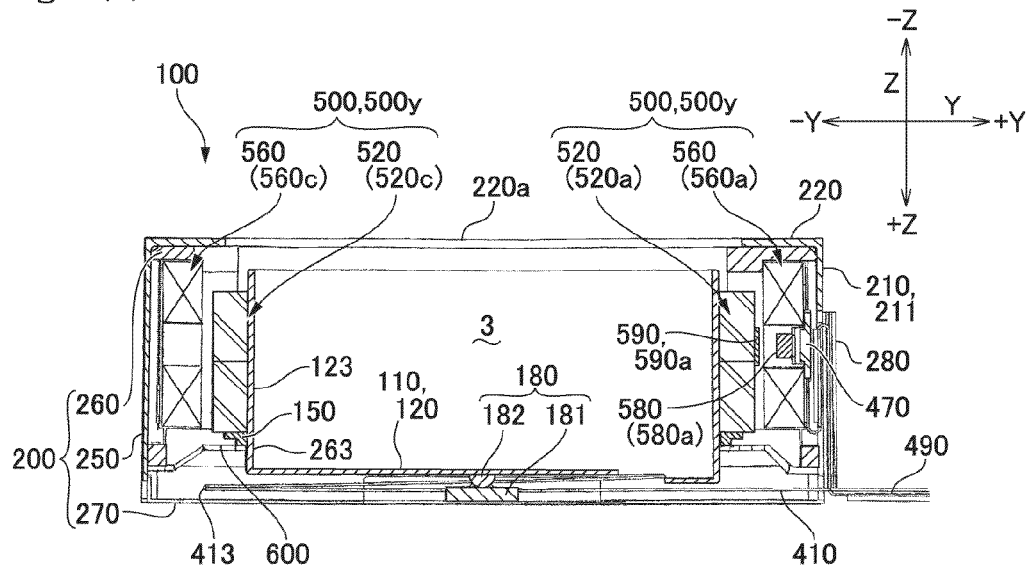
FIGS. 8(a) and 8(b) are explanatory views showing a structure of "YZ" cross section in an optical unit with a shake correcting function in accordance with a first embodiment of the present invention.
Figure 8B:
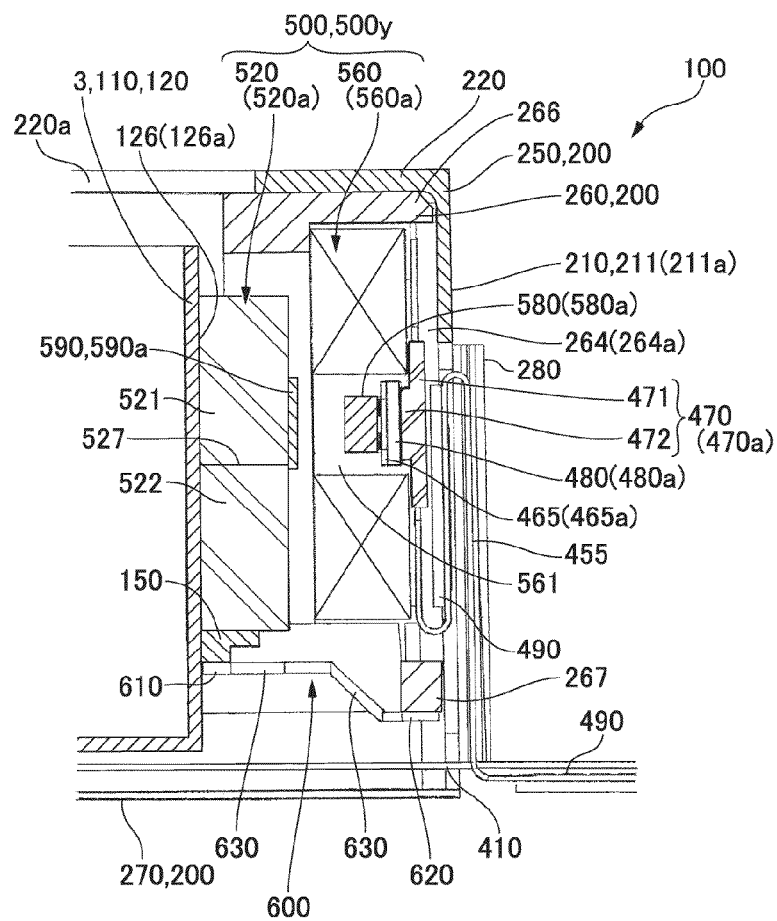

FIGS. 8(a) and 8(b) are explanatory views showing a structure of "YZ" cross section in the optical unit 100 with a shake correcting function in accordance with the first embodiment of the present invention. FIG. 8(a) is the "YZ" cross section showing the optical unit 100 which is cut at the position passing the swing support point 180 and FIG. 8(*b*) is an enlarged cross-sectional view showing a part of the optical unit 100. FIGS. 9(*a*) and 9(*b*) are explanatory views showing a structure of "ZX" cross section in the optical unit 100 with a shake correcting function in accordance with the first embodiment of the present invention. FIG. 9(*a*) is the "ZX" cross section showing the optical unit 100 which is cut at the position passing the swing support point 180 and FIG. 9(*b*) is its enlarged cross-sectional view showing a part of the optical unit 100. In FIGS. 8(*a*) and 8(*b*) and FIGS. 9(*a*) and 9(*b*), only the tube-shaped case 120 of the movable body 3 is shown and the photographing unit 1 and the upper case 130 are not shown. Further, the spring member 600 is in a planar shape in a state that a load is not applied but, when the movable body 3 is assembled into the fixed body 200, the movable body 3 is pressed to the front side in the optical axis direction by the swing support point 180. As a result, the spring member 600 is deformed but the deformed shape of the spring member 600 is schematically shown.

As shown in FIG. 7, FIGS. 8(*a*) and 8(*b*) and FIGS. 9(*a*) and 9(*b*), in order to fix the movable body side connection part 610 of the spring member 600 to the side face part (tube-shaped case 120) of the movable body 3 over the entire periphery, a rectangular frame-shaped connection member 150 is fixed to an outer peripheral face of the tube-shaped case 120 and the spring member 600 is fixed to the connection member 150. More specifically, the rectangular tube part 123 of the tube-shaped case 120 is fixed with the rectangular frame-shaped connection member 150 at a midway position in the optical axis direction. The movable body side connection part 610 of the spring member 600 is fixed to the connection member 150. In this embodiment, the connection member 150 is fixed to the tube-shaped case 120 over its entire periphery with an adhesive and the movable body side connection part 610 of the spring member 600 is fixed to the connection member 150 over its entire periphery with an adhesive.

Further, in this embodiment, a stopper mechanism is structured which determines a movable range when the movable body 3 is displaced to an object to be photographed side in the optical axis direction by utilizing the connection member 150. More specifically, in the coil holder 260 which is described with reference to FIG. 5, a rear side end part in the optical axis direction of the vertical frame portion 265 faces the connection member 150 through a space on the front side in the optical axis direction and the stopper mechanism is structured in each of four corner portions of the movable body 3. Therefore, even when the movable body 3 is displaced to the front side in the optical axis direction due to an impact from the outside or the like, the connection member 150 is abutted with a rear side end part in the optical axis direction of the vertical frame portion 265 of the coil holder 260 and thus the movable body 3 is prevented from being further displaced.
(Structure of Flexible Wiring Board 410)

As shown in FIG. 7, the optical unit 100 includes the flexible wiring board 410 which is connected with the movable body 3. A portion of the flexible wiring board 410 located in an inside of the tube-shaped case 120 of the movable body 3 is connected with the photographing unit 1 shown in FIG. 3(*a*). When the flexible wiring board 410 applies a load to the movable body 3 at the time of swinging of the movable body 3, there may occur a problem in appropriate swinging of the movable body 3. In order to prevent this problem, the flexible wiring board 410 is extended from a portion 412 connected with the movable body 3 on one side "+Y" in the "Y"-axis direction toward the other side "−Y" and then is folded back toward the one side "+Y" to be extended to the outside.

Therefore, a length of the flexible wiring board 410 is long because the flexible wiring board 410 is provided with the folded-back portion 413 between the portion connected with the movable body 3 and the portion extended to the outside. Accordingly, since the flexible wiring board 410 smoothly follows a swing of the movable body 3, a large load is not applied to the movable body 3.

Further, the flexible wiring board 410 is formed with a slit 418 having a wide width which is extended along the extended direction ("Y"-axis direction) at a midway portion in the length direction and the flexible wiring board 410 is divided into two divided portions 416 and 417. Therefore, the rigidity of the flexible wiring board 410 is relaxed. Accordingly, the flexible wiring board 410 smoothly follows a swing of the movable body 3 and thus a large load is not applied to the movable body 3. Further, the flexible wiring board 410 is overlapped with the movable body 3 in the optical axis direction but the overlapped portion with the swing support point 180 is formed with the slit 418. Therefore, even when the flexible wiring board 410 is disposed at an overlapped position with the movable body 3 in the optical axis direction, the swing support point 180 is arranged without a problem.

Further, as shown in FIG. 8(*a*), the folded-back portion 413 of the flexible wiring board 410 is located at the substantially same height position as the swing center of the movable body 3 in the swing support point 180 (the contacting portion of the support plate 181 with the hemispherical protruded part 182). Therefore, displacement of the flexible wiring board 410 is restrained small when the movable body 3 is swung. Accordingly, influence of the flexible wiring board 410 which is applied to the movable body 3 is reduced and thus the movable body 3 is swing with a high degree of accuracy.
(Structure and Basic Operation of Shake Correction Drive Mechanism 500 and the Like)

Figure 10:
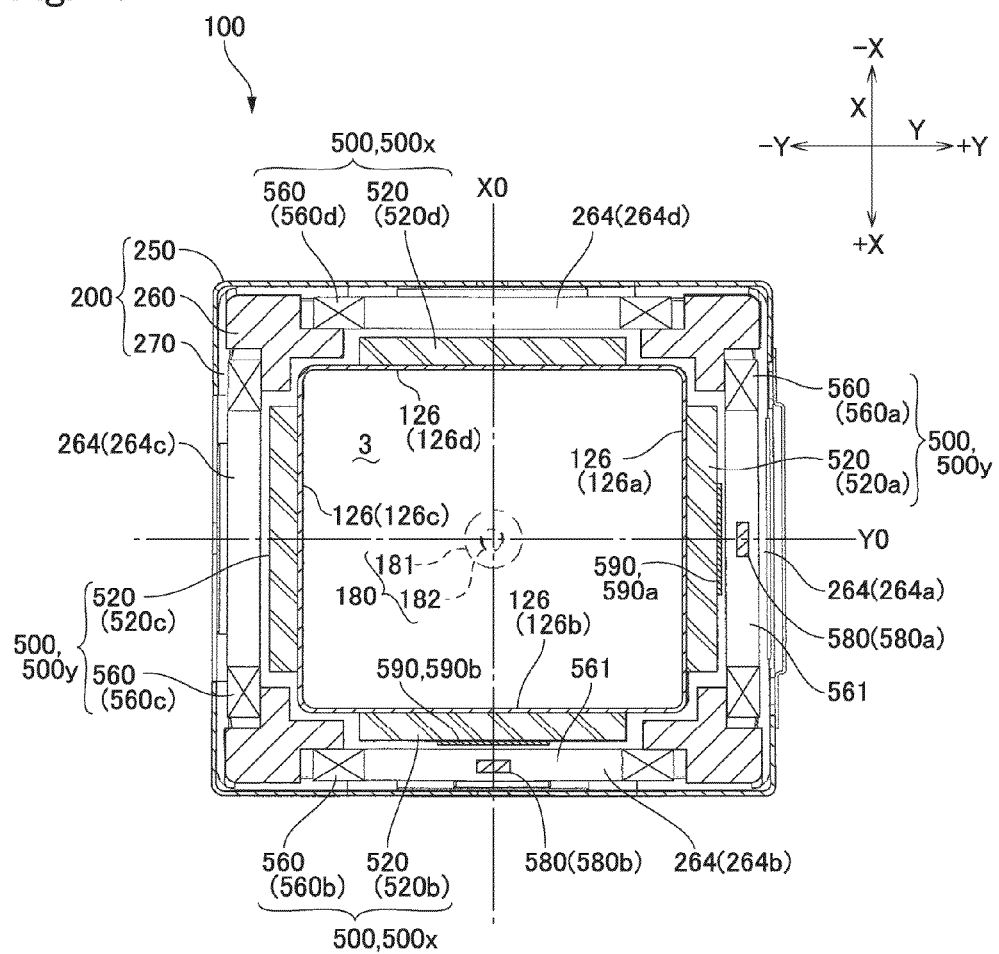
FIG. 10 is an "XY" cross-sectional view showing an optical unit with a shake correcting function in accordance with a first embodiment of the present invention.

FIG. 10 is an "XY" cross-sectional view showing the optical unit 100 with a shake correcting function in accordance with the first embodiment of the present invention. In FIG. 10, the photographing unit 1 and the upper case 130 of the movable body 3 are not shown and only the tube-shaped case 120 is shown. Further, in FIG. 10, a rigid board, a spacer and the flexible wiring board 490 which are located on the back side with respect to the photo reflector 580 are not shown.

As shown in FIG. 7 and FIGS. 8(*a*) and 8(*b*), when the movable body 3 is assembled into an inside of the fixed body 200, the support plate 181 fixed to the lower cover 270 is abutted with the protruded part 182 of the movable body 3 to structure the swing support point 180. In this case, the movable body side connection part 610 of the spring member 600 is set to be pressed up to an object to be photographed side with respect to the fixed body side connection part 620 and the arm parts 630 of the spring member 600 urge the movable body 3 to the rear side in the optical axis direction. Therefore, the protruded part 182 of the movable body 3 is elastically abutted with the lower cover 270 and the movable body 3 is supported by the fixed body 200 in a swingable state through the swing support point 180.

Further, as shown in FIGS. 8(*a*) and 8(*b*) and FIG. 10, in the magnets 520 on the movable body 3 and the air-core coils 560 on the fixed body 200, the magnets 520 (first magnet 520*a* and third magnet 520*c*) and the air-core coils 560 (first air-core coil 560*a* and third air-core coil 560*c*) are located at two positions interposing the movable body 3 on both sides in the "Y"-axis direction on the axial line "Y0" passing through the swing support point 180 and extended in the "Y"-axis direction. The magnets 520 and the air-core coils 560 structure a "Y"-side shake correction drive mechanism 500y (shake correction drive mechanism 500). The "Y"-side shake correction drive mechanism 500y swings the movable body 3 with the axial line "X0", which passes through the swing support point 180 and is extended in the "X"-axis direction, as a swing center.

Figure 9A:
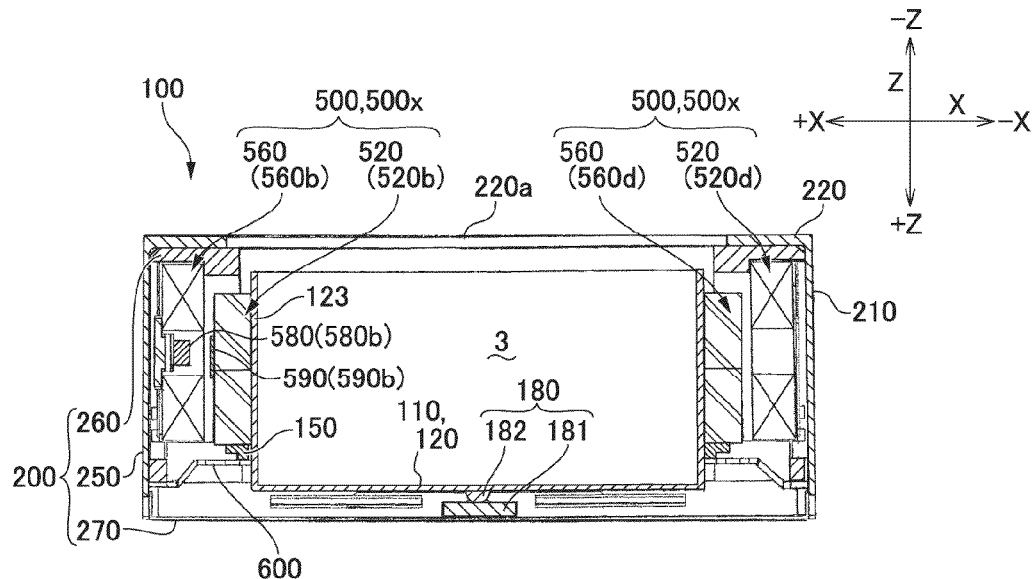
FIGS. 9(a) and 9(b) are explanatory views showing a cross sectional structure in an optical unit with a shake correcting function in accordance with a first embodiment of the present invention.
Figure 9B:
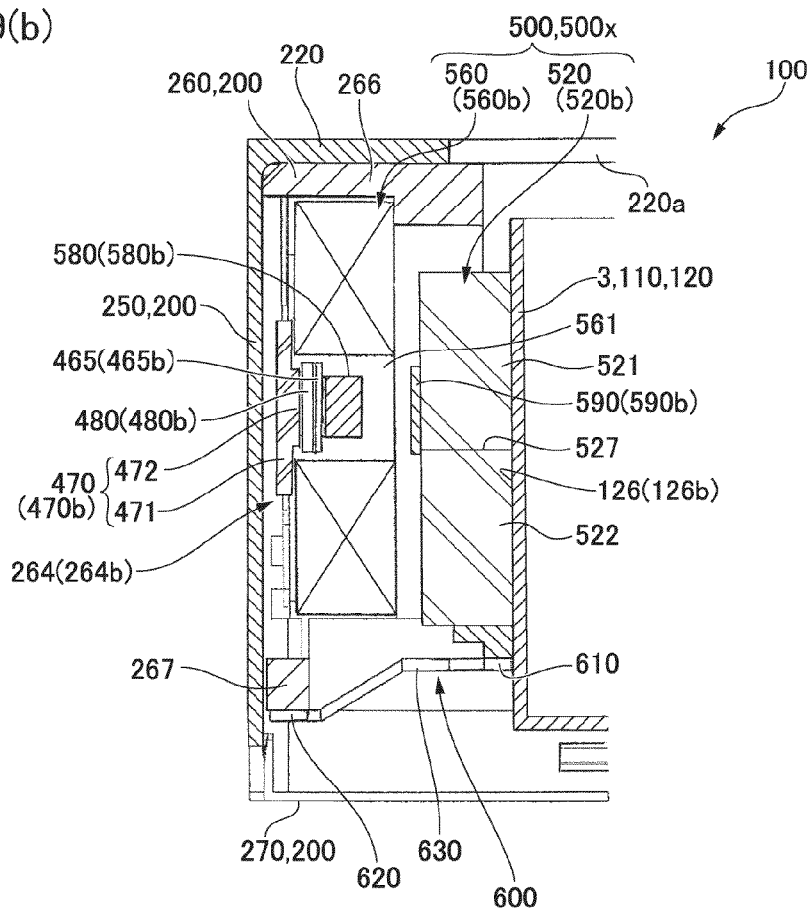

On the other hand, as shown in FIGS. 9(a) and 9(b) and FIG. 10, the magnets 520 (second magnet 520b and fourth magnet 520d) and the air-core coils 560 (second air-core coil 560b and fourth air-core coil 560d) are located at two positions interposing the movable body 3 on both sides in the "X"-axis direction on the axial line "X0" passing through the swing support point 180 and extended in the "X"-axis direction. The magnets 520 and the air-core coils 560 structure an "X"-side shake correction drive mechanism 500x (shake correction drive mechanism 500). The "X"-side shake correction drive mechanism 500x swings the movable body 3 with the axial line "Y0", which passes through the swing support point 180 and is extended in the "Y"-axis direction, as a swing center.

Therefore, in the optical unit 100 in this embodiment, when the optical device 1000 shown in FIG. 1 is swung, the swing is detected by a gyroscope and a control IC (not shown) controls the shake correction drive mechanism 500. In other words, a drive current is supplied to the air-core coils 560 so as to cancel the swing which is detected by the gyroscope. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as a swing center. Further, when the swing around the "X"-axis and the swing around the "Y"-axis of the movable body 3 are combined with each other, the movable body 3 can be displaced over the entire "XY" plane. Therefore, all shakes occurred in the optical unit 100 can be corrected surely. In this case, the second photo reflector 580b and the first photo reflector 580a detect a distance (displacement) to the movable body 3 and the shake correction drive mechanism 500 is controlled on the basis of a detection result by the second photo reflector 580b and the first photo reflector 580a.

(Structure of Photo Reflector 580)

As described with reference to FIGS. 7 through 10, in the optical unit 100 in this embodiment, in order to structure the shake correction drive mechanism 500, the air-core coils 560 (first air-core coil 560a, second air-core coil 560b, third air-core coil 560c and fourth air-core coil 560d) are respectively provided on four side faces 264 of the coil holder 260 of the fixed body 200. Further, the magnets 520 (first magnet 520a, second magnet 520b, third magnet 520c and fourth magnet 520d) are respectively provided on four side faces 126 (side faces 126a, 126b, 126c and 126d) of the movable body 3 (tube-shaped case 120).

In order to provide two photo reflectors 580 (first photo reflector 580a and second photo reflector 580b) in the optical unit 100, in this embodiment, an inner side region 561 of the air-core coil 560 is utilized.

More specifically, as shown in FIG. 6, a surface-mounting type of the first photo reflector 580a is mounted in an inner side region 561 of the first air-core coil 560a of the belt-shaped portion 460 of the flexible wiring board 490, and a surface-mounting type of the second photo reflector 580b is mounted in an inner side region 561 of the second air-core coil 560b. Therefore, when the optical unit 100 is assembled, as shown in FIGS. 8(a) through 10, in the side face 264a on the one side "+Y" which is directed to the other side "−Y" in the "Y"-axis direction, the first photo reflector 580a is provided at a position superposing the axial line "Y0" in the "Z"-axis direction in an inner side region 561 of the first air-core coil 560a. Further, in the side face 264b on the one side "+X" which is directed to the other side "−X" in the "X"-axis direction, the second photo reflector 580b is provided at a position superposing the axial line "X0" in the "Z"-axis direction in an inner side region 561 of the second air-core coil 560b.

In this state, a light emission part and a light receive part of the first photo reflector 580a face the first magnet 520a in the "Y"-axis direction, and a light emitting part and a light receiving part of the second photo reflector 580b face the second magnet 520b in the "X"-axis direction.

(Structure of Smooth Layer 590)

Figure 11A:
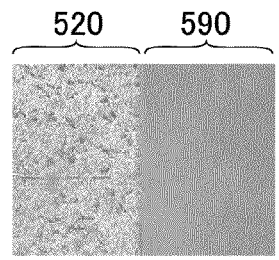
FIGS. 11(a) through 11(d) are explanatory views showing a smooth layer which is used in an optical unit with a shake correcting function in accordance with a first embodiment of the present invention.
Figure 11B:
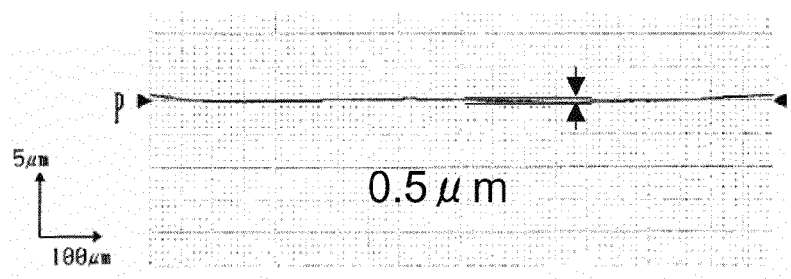
Figure 11C:
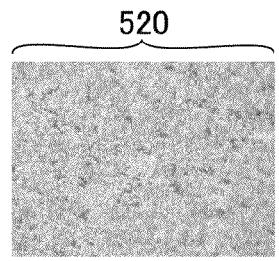
Figure 11D:
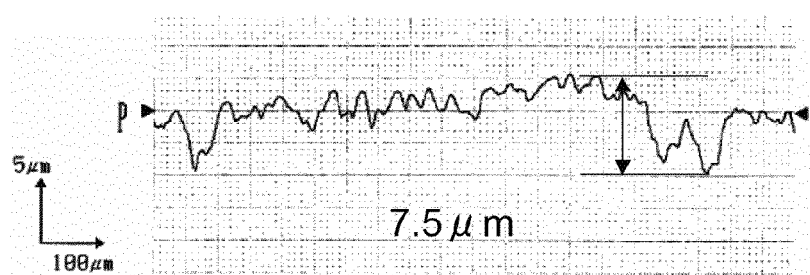
Figure 12A:
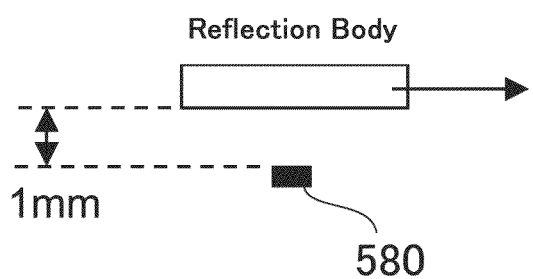
FIGS. 12(a) and 12(b) are explanatory views showing uniformity in reflecting property of a smooth layer which is used in an optical unit with a shake correcting function in accordance with a first embodiment of the present invention.
Figure 12B:
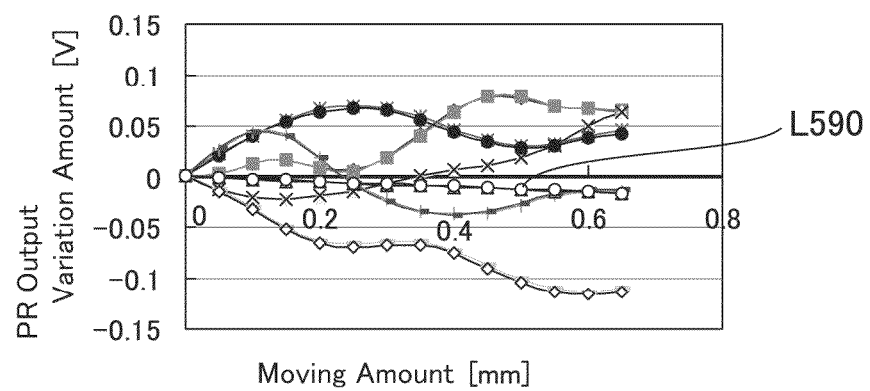
Figure 13A:
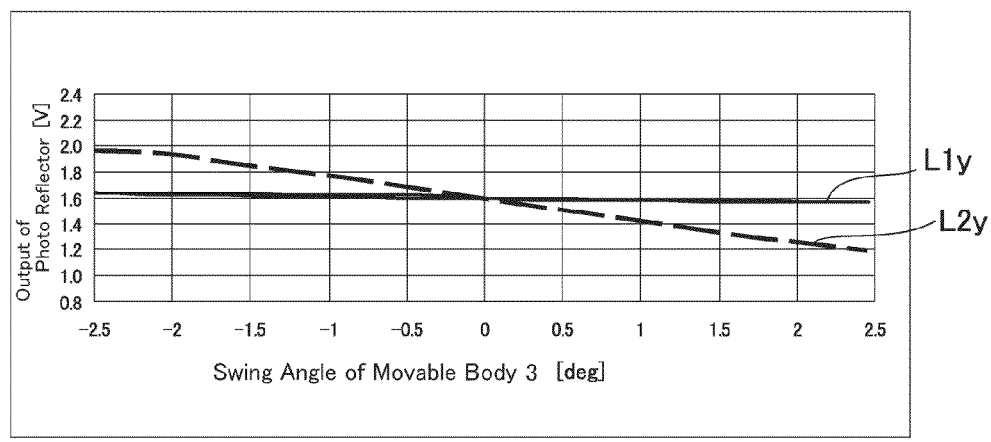
FIGS. 13(a) and 13(b) are explanatory views showing outputs from photo reflectors when a movable body is swung in an optical unit with a shake correcting function in accordance with a first embodiment of the present invention.
Figure 13B:
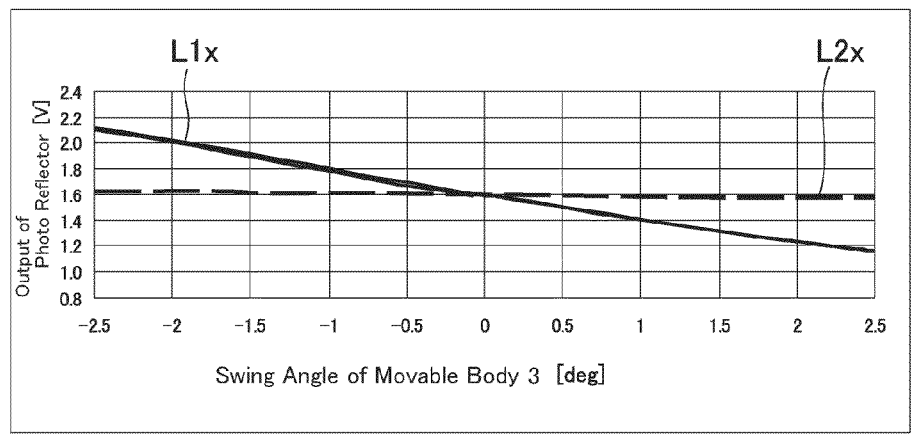

FIGS. 11(a) through 11(d) are explanatory views showing a smooth layer 590 which is used in the optical unit 100 with a shake correcting function in accordance with the first embodiment of the present invention. FIG. 11(a) is an explanatory view showing a state that a smooth layer 590 is superposed on a surface of the magnet 520, FIG. 11(b) is an explanatory view showing a measured result of surface roughness of the smooth layer 590, FIG. 11(c) is an explanatory view showing a state of a surface of the magnet 520, and FIG. 11(d) is an explanatory view showing a measured result of surface roughness of the magnet 520. FIGS. 12(a) and 12(b) are explanatory views showing uniformity in reflecting property of the smooth layer 590 which is used in the optical unit 100 with a shake correcting function in accordance with the first embodiment of the present invention. FIG. 12(a) is an explanatory view showing a method for measuring uniformity in reflecting property of the smooth layer 590, and FIG. 12(b) is an explanatory view showing measured results of uniformity in reflecting property of the smooth layer 590. FIGS. 13(a) and 13(b) are explanatory view showing outputs from photo reflectors 580 when the movable body 3 is swung in the optical unit 100 with a shake correcting function in accordance with the first embodiment of the present invention. FIG. 13(a) is an explanatory view showing outputs from the photo reflectors 580 when the movable body 3 is swung around the axial line "X0" and FIG. 13(b) is an explanatory view showing outputs from the photo reflectors 580 when the movable body 3 is swung around the axial line "Y0".

In this embodiment, as shown in FIGS. 4 and 7, FIGS. 8(a) and 8(b), FIGS. 9(a) and 9(b) and FIG. 10, a first reflective smooth layer 590a which is described with reference to FIGS. 2(a) through 2(d) is laminated on a face of the first magnet 520a on a side where the first photo reflector 580a is located, and a second reflective smooth layer 590b which is described with reference to FIGS. 2(a) through 2(d) is laminated on a face of the second magnet 520b on a side where the second photo reflector 580b is located. The smooth layer 590 (first smooth layer 590a and second smooth layer 590b) is made of a resin tape, a metal sheet, coating layer, a plate-shaped glass or a reflection plate. In this embodiment, a polyamide resin tape whose thickness is about 50 μm is used as the smooth layer 590 and its hue is bright color such as yellow.

Further, the smooth layer 590 is provided over the entire region facing the photo reflector 580 when the movable body 3 is swung. Therefore, even when the movable body 3 is swung, the light emitting part and the light receiving part of the first photo reflector 580a always face the first smooth layer 590a in the "Y"-axis direction, and the light emitting part and the light receiving part of the second photo reflector 580b always face the second smooth layer 590b in the "X"-axis direction. Accordingly, even when the movable body 3 is swung, light emitted from the light emitting part of the first photo reflector 580a is always reflected by the first smooth layer 590a and received by the light receiving part of the first photo reflector 580a, and light emitted from the light emitting part of the second photo reflector 580b is always reflected by the second smooth layer 590b and received by the light receiving part of the second photo reflector 580b.

In this embodiment, the magnet 520 is a sintered magnet and its surface is formed in a flat face as shown in FIG. 11(c) but, as shown in FIG. 11(d), the surface is provided with minute unevenness whose roughness is about 7.5 μm. On the other hand, the surface of the smooth layer 590 is, as shown in FIG. 11(a), formed in a flat face and, in addition, the entire surface is formed in a smooth and flat face whose roughness is about 0.5 μm as shown in FIG. 11(b). Therefore, as shown in FIG. 12(a), the magnet 520 or a laminated body structured of the smooth layer 590 superposed on the surface of the magnet 520 is used as a reflection body and, when an output from the photo reflector 580 is measured while moving the reflection body from a position separated from the photo reflector 580 by 1 mm, the results shown in FIG. 12(b) are obtained. In FIG. 12(b), the results shown by the white circle and solid line "L590" are results of a case that a laminated body structured of the smooth layer 590 superposed on the surface of the magnet 520 is used as a reflection body and, even when the moving body is moved, an output from the photo reflector 580 is approximately constant. On the other hand, in FIG. 12(b), the results except the results shown by the white circle and solid line "L590" are results of cases that a body in which the smooth layer 590 is not superposed on the surface of the magnet 520 (magnet 520 itself) is used as a reflection body and, when the moving body is moved, outputs from the photo reflector 580 are largely varied.

Therefore, in the optical unit 100 in this embodiment, when the movable body 3 is turned around the axial line "Y0" with the swing support point 180 as a turning center, an output from the first photo reflector 580a and an output from the second photo reflector 580b are respectively varied as shown by the solid line "L1y" and the dotted line "L2y" in FIG. 13(a). As understood by FIG. 13(a), the output from the first photo reflector 580a is substantially constant and the output from the second photo reflector 580b varies linearly with respect to a swing angle of the movable body 3. Further, in the optical unit 100 in this embodiment, when the movable body 3 is turned around the axial line "X0" with the swing support point 180 as a turning center, an output from the first photo reflector 580a and an output from the second photo reflector 580b are respectively varied as shown by the solid line "L1x" and the dotted line "L2x" in FIG. 13(b). As understood by FIG. 13(b), the output from the second photo reflector 580b is substantially constant and the output from the first photo reflector 580a varies linearly with respect to a swing angle of the movable body 3.

Therefore, a distance to the movable body 3 is obtained on the basis of a detection result by the first photo reflector 580a when the movable body 3 is driven by the "Y"-side shake correcting drive mechanism 500y and is turned around the axial line "X0" and thus displacement in the "Y"-axis direction of the movable body 3 is monitored. Further, a distance to the movable body 3 is obtained on the basis of a detection result by the second photo reflector 580b when the movable body 3 is driven by the "X"-side shake correcting drive mechanism 500x and is turned around the axial line "Y0" and thus displacement in the "X"-axis direction of the movable body 3 is monitored. Accordingly, displacement of the movable body 3 when turned around the axial line "X0" and displacement of the movable body 3 when turned around the axial line "Y0" are monitored independently and thus turning of the movable body 3 around the axial line "X0" and turning of the movable body 3 around the axial line "Y0" can be controlled independently.

(Peripheral Structure of Photo Reflector 580)

Figure 14A:
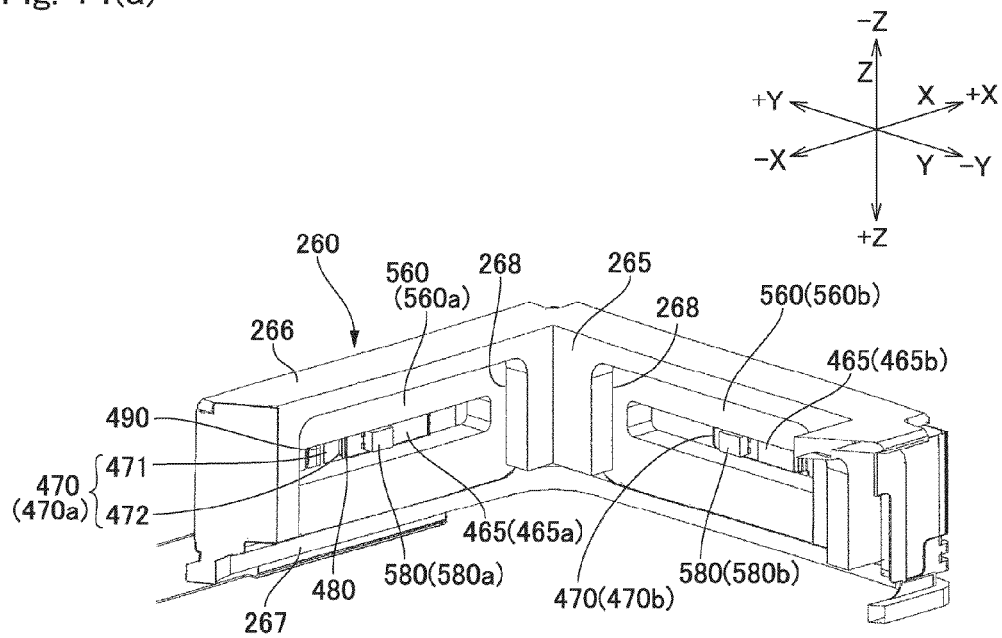
FIGS. 14(a) through 14(c) are explanatory views showing a fixing structure of a photo reflector to a fixed body which is provided in an optical unit with a shake correcting function in accordance with a first embodiment of the present invention.
Figure 14B:
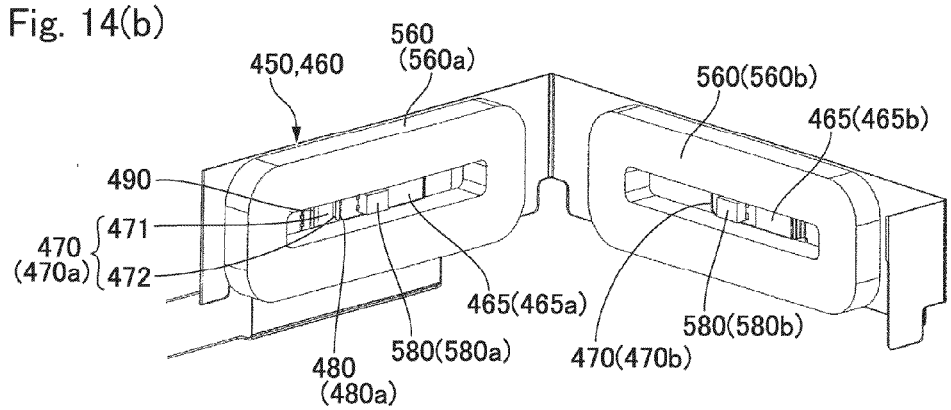
Figure 14C:
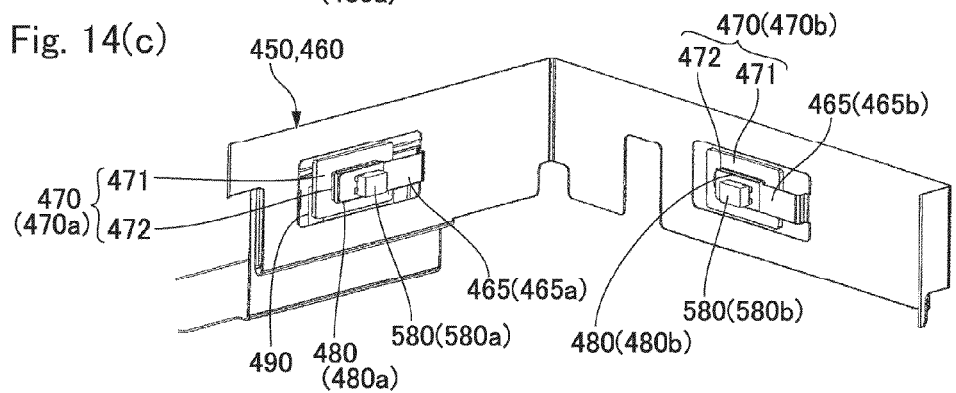
Figure 15A:
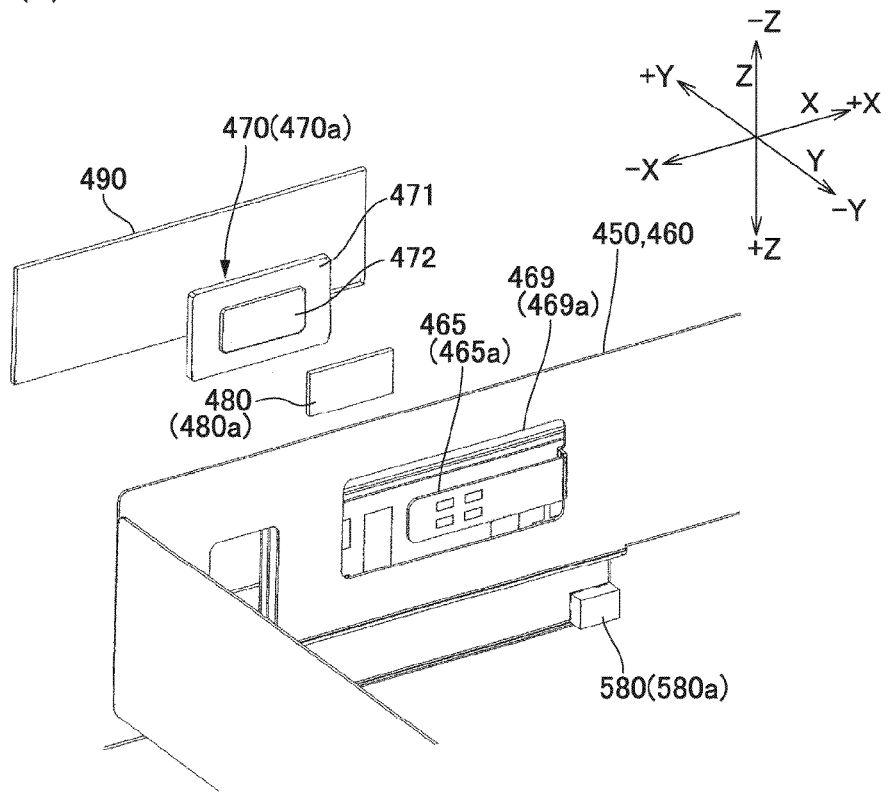
FIGS. 15(a) and 15(b) are explanatory views showing a spacer and the like which is provided in an optical unit with a shake correcting function in accordance with a first embodiment of the present invention.
Figure 15B:
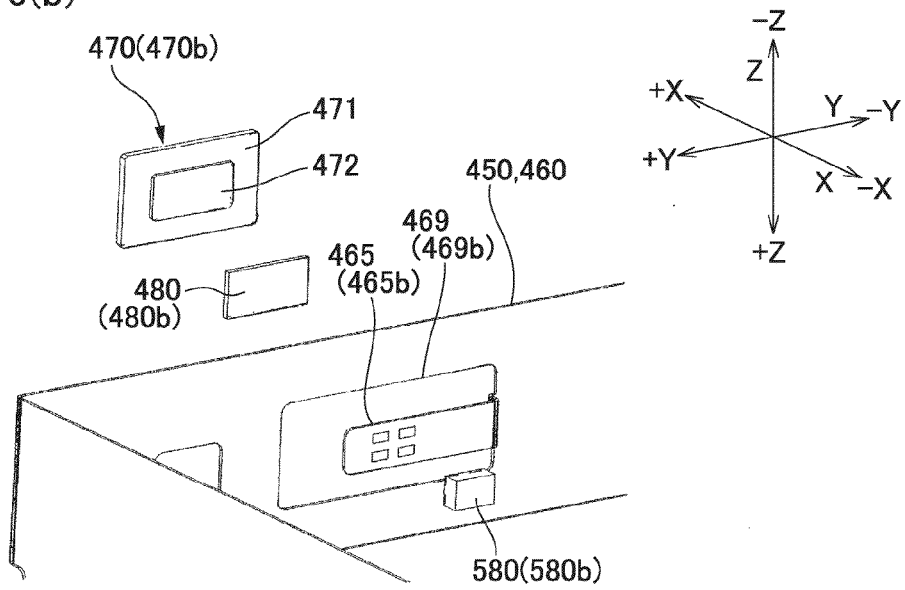
Figure 16:
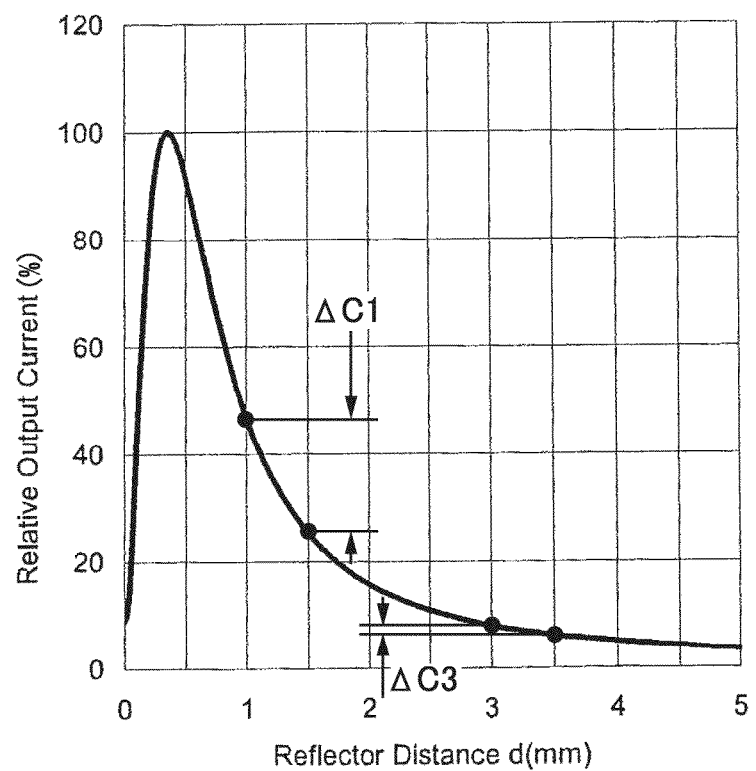
FIG. 16 is an explanatory view showing a relationship of a distance between a photo reflector and a reflection face to an output current value from the photo reflector.

FIGS. 14(a) through 14(c) are explanatory views showing a fixing structure of the photo reflector 580 to the fixed body 200 (coil holder 260) which is provided in the optical unit 100 with a shake correcting function in accordance with the first embodiment of the present invention. FIG. 14(a) is an explanatory view showing a state that the first photo reflector 580a is mounted on the coil holder 260 and which is viewed from an inner side of the coil holder 260, FIG. 14(b) is an explanatory view showing the belt-shaped portion 460 of the flexible wiring board 490 on which the second photo reflector 580b is mounted and which is viewed from an inner side, and FIG. 14(c) is an explanatory view showing a state that the air-core coil 560 is detached from the belt-shaped portion 460 of the flexible wiring board 490 and which is viewed from an inner side. FIGS. 15(a) and 15(b) are explanatory views showing a spacer and the like which is provided in the optical unit 100 with a shake correcting function in accordance with the first embodiment of the present invention. FIG. 15(a) is an explanatory view showing a state that a spacer is provided for the first photo reflector 580a and FIG. 15(b) is an explanatory view showing a state that a spacer is provided for the second photo reflector 580b. FIG. 16 is an explanatory view showing a relationship of a distance between the photo reflector 580 and the reflection face (smooth surface 590) to an output current value from the photo reflector 580.

As shown in FIG. 6, FIGS. 14(a) through 14(c), and FIGS. 15(a) and 15(b), the photo reflector 580 (first photo reflector 580a and second photo reflector 580b) is mounted on the flexible wiring board 490 which is common to the air-core coil 560 (first air-core coil 560a and second air-core coil 560b). However, as shown in FIGS. 8(a) through 10, the photo reflector 580 (first photo reflector 580a and second photo reflector 580b) is provided in the inner side region 561 of the air-core coil 560 at a position displaced from the back face of the air-core coil 560 to a side where the magnet 520 (first magnet 520a and second magnet 520b) is located and, in addition, a thickness dimension of the photo reflector 580 is smaller than a thickness dimension of the air-core coil 560. Therefore, the photo reflector 580 (first photo reflector 580a and second photo reflector 580b) is disposed in the inner side region 561 of the air-core coil 560 at a substantially center in the thickness direction of the air-core coil 560 (first air-core coil 560a and second air-core coil 560b) so as not to protrude from an end face of the air-core coil 560 facing the movable body 3. Therefore, a distance between the photo reflector 580 (first photo reflector 580a and second photo reflector 580b) and the magnet 520 (first magnet 520a and second magnet 520b) is set to be shorter. According to this structure, as described below with reference to FIG. 16, sensitivity of the photo reflector 580 (first photo reflector 580a and second photo reflector 580b) can be improved.

A relationship between a separated distance between the photo reflector 580 and the smooth layer 590 as a reflection face and an output current from the photo reflector 580 is shown in FIG. 16. As shown in FIG. 16, when a separated distance between the photo reflector 580 and the smooth layer 590 as a reflection face is short, an output current from the photo reflector 580 is large and, as the distance between the photo reflector 580 and the smooth layer 590 becomes longer, the output current from the photo reflector 580 is lowered in a curved manner. In other words, when a separated distance between the photo reflector 580 and the smooth layer 590 becomes longer, an output current from the photo reflector 580 is rapidly lowered and then gradually reduced. Therefore, for example, when a case of that a separated distance between the photo reflector 580 and the smooth layer 590 is 1 mm is compared with a case of that a separated distance is 3 mm, in a case that the movable body 3 (magnet 520) is displaced by 0.5 mm, only a variation as shown by the "ΔC3" is generated in a case that the separated distance is 3 mm but, in a case that the separated distance is 1 mm, a variation as shown by the "ΔC1" (ΔC1>ΔC3) is generated. Therefore, a higher degree of sensitivity is obtained when the separated distance between the photo reflector 580 and the smooth layer 590 is shorter.

In order to realize the above-mentioned structure, in this embodiment, as shown in FIGS. 14(*a*) through 14(*c*) and FIGS. 15(*a*) and 15(*b*), in regions where the first air-core coil 560*a* and the second air-core coil 560*b* are mounted in the belt-shaped portion 460 of the flexible wiring board 490, the periphery of a portion where the photo reflector 580 is mounted is cut off on three sides and a portion where the photo reflector 580 is mounted is formed in a thin width portion 465 (first thin width portion 465*a* and second thin width portion 465*b*). Further, the thin width portion 465 is bent to a side where the movable body 3 is located with respect to the belt-shaped portion 460 and a rectangular hole 469 is formed in the belt-shaped portion 460.

In order to bend the thin width portion 465 to the side where the movable body 3 is located, in this embodiment, a rigid board 480 for reinforcement (first rigid board 480*a* and second rigid board 480*b*) is adhesively bonded on a rear face of the thin width portion 465 (first thin width portion 465*a* and second thin width portion 465*b*). The rigid board 480 is smaller than the hole 469. Further, a plate-shaped spacer 470 (first spacer 470*a* and second spacer 470*b*) is disposed on a rear side of the rigid board 480 and the spacer 470 is larger than the rigid board 480. The spacer 470 is provided with a plate-shaped main body part 471, which is larger than the hole 469 and is located on an outer side of the belt-shaped portion 460, and a protruded part 472 which is protruded toward a side of the movable body 3 from the plate-shaped main body part 471. The protruded part 472 is smaller than the plate-shaped main body part 471 and the hole 469. Therefore, the plate-shaped main body part 471 of the spacer 470 is adhesively bonded to an outer face of the belt-shaped portion 460 at two positions interposing the hole 469 on both sides in the optical axis direction and, in this state, the protruded part 472 presses the rigid board 480 toward a side where the movable body 3 is located from the rear side. Accordingly, in the belt-shaped portion 460 of the flexible wiring board 490, the thin width portion 465 on which the photo reflector 580 is mounted is bent toward the inner side region 561 of the air-core coil 560. Therefore, although the photo reflector 580 is mounted on the flexible wiring board 490 which is common to the air-core coils 560, the photo reflector 580 is disposed in the inner side region 561 of the air-core coil 560 at a position displaced from the back face of the air-core coil 560 to a side where the magnet 520 is located and the photo reflector 580 is disposed at an approximately middle position in the thickness direction of the air-core coil 560.

In this embodiment, the bent portion 495 is located on the rear side of the first photo reflector 580*a* and thus the rigid board 480 is disposed between the bent portion 495 and the first spacer 470*a* and the rigid board 480 is adhesively bonded to the bent portion 495.

The photo reflector 580 is formed in a rectangular planar shape and is provided with a short side and a long side. Further, the photo reflector is provided with a center of the light emitting part on one side in the longitudinal direction and a center of the light receiving part on the other side. Further, in the photo reflector 580, a shading part is formed between the light emitting part and the light receiving part. In order to dispose the photo reflector 580 having a structure as described above, the photo reflector 580 is disposed so that its longitudinal direction is directed toward a direction around the optical axis. In other words, the first photo reflector 580*a* and the second photo reflector 580*b* are disposed so that the center of the light emitting part and the center of the light receiving part are arranged in a direction around the optical axis. Further, the first photo reflector 580*a* and the second photo reflector 580*b* are reversely disposed to each other so that their light receiving parts (centers of their light receiving parts) are separated from each other. Therefore, light emitted from the first photo reflector 580*a* is hard to be received by the second photo reflector 580*b* as stray light and light emitted from the second photo reflector 580*b* is hard to be received by the first photo reflector 580*a* as stray light.

(Principal Effects in this Embodiment)

As described above, in the optical unit 100 (optical unit with a shake correcting function) in this embodiment, when the shake correction drive mechanism 500 is operated, the movable body 3 is swung with the swing support point 180 as a swing center. Therefore, even when a shake is occurred in the optical unit 100 due to a shake of hand or the like, the shake can be corrected by swinging of the movable body 3. Further, in this embodiment, in two directions intersecting the optical axis direction, the first photo reflector 580*a* is provided in the inner side region of the first air-core coil 560*a*, and the second photo reflector 580*b* is provided in the inner side region of the second air-core coil 560*b*. Therefore, displacement of the movable body 3 is monitored in each of two directions and, based on the monitored result, the shake correction drive mechanism 500 can be controlled.

Further, in the fixed body 200 and the movable body 3, the reflective smooth layer 590 (first smooth layer 590*a* and second smooth layer 590*b*) is superposed in a region facing the photo reflector 580 (first photo reflector 580*a* and second photo reflector 580*b*) and thus, even when the movable body 3 is swung, the photo reflector 580 always faces the smooth layer 590. Therefore, even when there is a scratch or the like in a region facing the photo reflector 580, the scratch is covered by the reflective smooth layer 590 and thus appropriate reflected light is always returned to the photo reflector 580. Accordingly, even when the photo reflector 580 is provided by utilizing a space between the side face of the movable body 3 and the side face of the fixed body 200, appropriate correlation can be obtained between an output from the photo reflector 580 and a swing angle of the movable body 3 and the swing of the movable body 3 can be monitored with a high degree of accuracy. Therefore, a swing of the movable body 3 can be controlled with a high degree of accuracy.

Further, the smooth layer 590 is superposed on the surface (flat face) of the magnet 520 and thus the smooth layer 590 is flatly superposed by superposing the smooth layer 590 on the surface of the magnet 520.

Further, the photo reflector 580 is provided in a free space, that is, the inner side region 561 of the air-core coil 560 which is used in the shake correction drive mechanism 500. Therefore, even when the photo reflector 580 is provided, increase of the size of the optical unit 100 in the optical axis direction and in a direction intersecting the optical axis direction is prevented. The photo reflector 580 is provided in the inner side region 561 of the air-core coil 560 and thus the photo reflector 580 is surrounded by the air-core coil 560. Therefore, light emitted from one of two photo reflectors 580 is prevented by the air-core coil 560 from being incident on the other photo reflector as a leaked light. Accordingly, erroneous detection by the photo reflector 580 due to a leaked light can be prevented and thus inclination of the optical axis can be corrected with a high degree of accuracy.

Further, the photo reflector 580 is provided at a position displaced from the back face of the air-core coil 560 to a side where the magnet 520 is located in the inner side region 561 of the air-core coil 560 and thus a separated distance between the photo reflector 580 and the smooth layer 590 is short. In addition, the smooth layer 590 is superposed on the surface of the magnet 520 and thus a separated distance between the photo reflector 580 and the reflection face is short. Therefore, as described with reference to FIG. 16, sensitivity of the photo reflector 580 is high.

In this embodiment, the air-core coil 560 and the photo reflector 580 are provided on the fixed body 200, and the shake correction drive mechanism 500 swings the movable body 3 with the swing support point 180 provided on the rear side in the optical axis direction with respect to the center position in the optical axis direction of the movable body 3 as a swing center. Therefore, in comparison with a structure that the air-core coil 560 and the photo reflector 580 are provided on the movable body 3 side, a wiring member for the air-core coil 560 and the photo reflector 580 is not required to be connected with the movable body 3.

(Improved Example of First Embodiment)

Figure 17A:
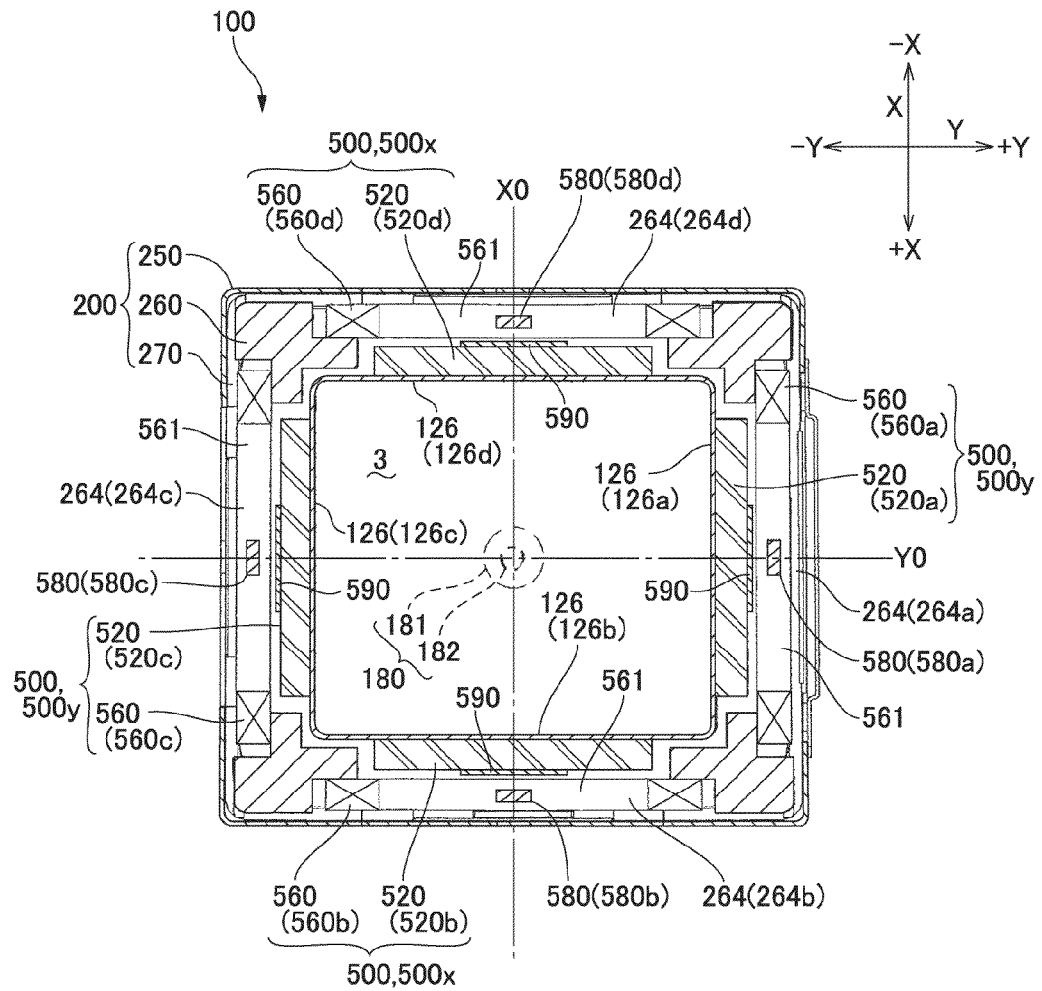
FIGS. 17(a) and 17(b) are explanatory views showing a displacement amount detection method in an optical unit with a shake correcting function in accordance with an improved example of a first embodiment of the present invention.
Figure 17B:
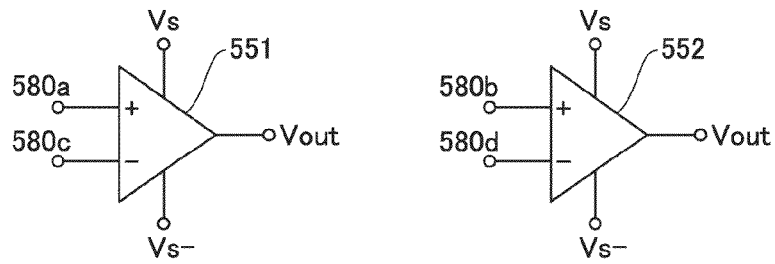

FIGS. 17(*a*) and 17(*b*) are explanatory views showing a displacement amount detection method in the optical unit 100 with a shake correcting function in accordance with an improved example of the first embodiment of the present invention. FIG. 17(*a*) is an "XY" cross-sectional view showing the optical unit 100 with a shake correcting function and FIG. 17(*b*) is an explanatory view showing a differential detection circuit.

In the embodiment described above, the first photo reflector 580*a* is provided in the inner side region 561 of the first air-core coil 560*a* and the second photo reflector 580*b* is provided in the inner side region 561 of the second air-core coil 560*b*. However, as shown in FIG. 17(*a*), it may be structured that a third photo reflector 580*c* is further provided in an inner side region 561 of the third air-core coil 560*c* and a fourth photo reflector 580*d* is further provided in an inner side region 561 of the fourth air-core coil 560*d*. More specifically, on the side face 264*c* of the other side "−Y" which is directed to one side "+Y" in the "Y"-axis direction, the third photo reflector 580*c* is provided at a position superposed on the axial line "Y0" in the "Z"-axis direction in the inner side region 561 of the third air-core coil 560*c* and, on the side face 264*d* of the other side "−X" which is directed to one side "+X" in the "X"-axis direction, the fourth photo reflector 580*d* is provided at a position superposed on the axial line "X0" in the "Z"-axis direction in the inner side region 561 of the fourth air-core coil 560*d*. Also in this case, the smooth layer 590 is provided at positions facing the first photo reflector 580*a*, the second photo reflector 580*b*, the third photo reflector 580*c* and the fourth photo reflector 580*d*.

In a case that this structure is adopted, as shown in FIG. 17(*b*), when outputs from the first photo reflector 580*a* and the third photo reflector 580*c* are inputted into a differential amplification circuit 551 (differential amplifier), a swing around the axial line "X0" of the movable body 3 can be obtained with a high degree of sensitivity. Further, when outputs from the second photo reflector 580*b* and the fourth photo reflector 580*d* are inputted into a differential amplification circuit 552 (differential amplifier), a swing around the axial line "Y0" of the movable body 3 can be obtained with a high degree of sensitivity.

[Second Embodiment]

(Entire Structure of Optical Unit)

Figure 18A:
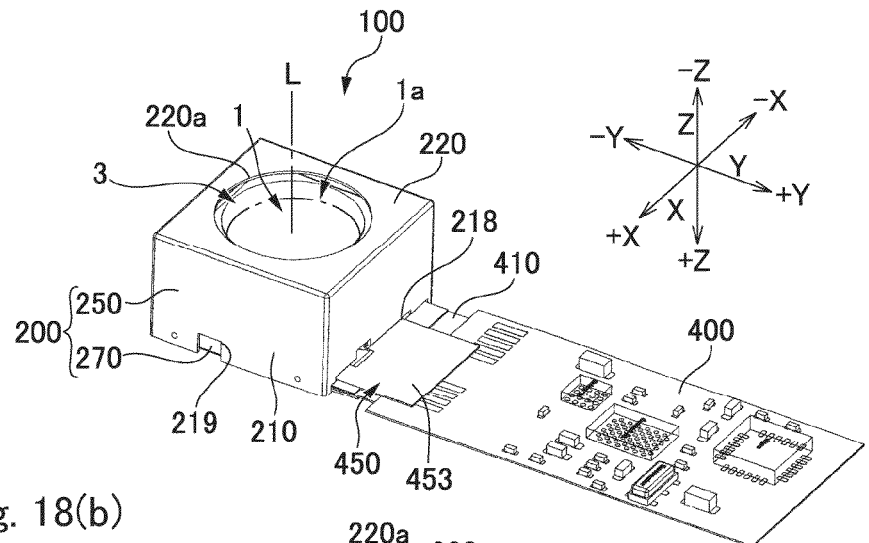
FIGS. 18(a) and 18(b) are explanatory views showing an entire structure of an optical unit with a shake correcting function in accordance with a second embodiment of the present invention.
Figure 18B:
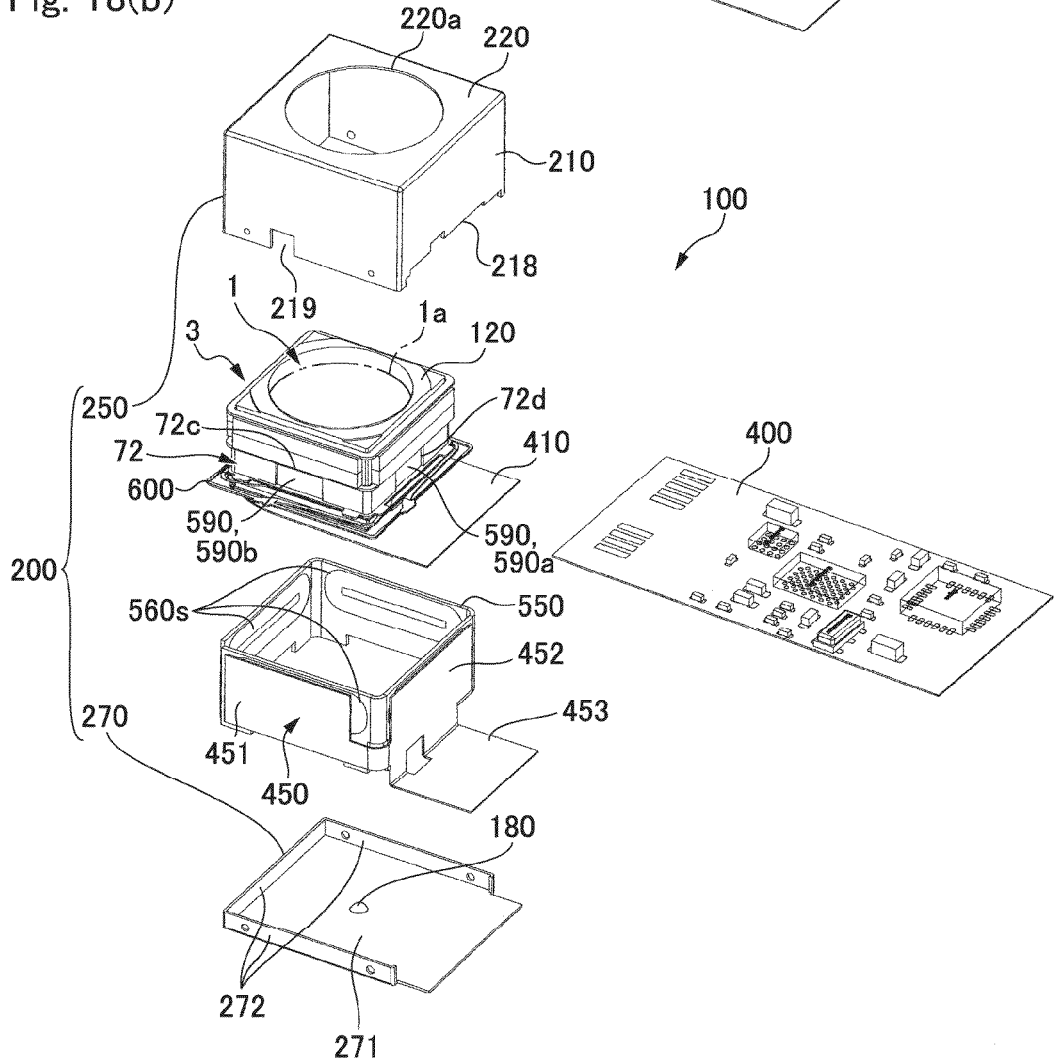

FIGS. 18(*a*) and 18(*b*) are explanatory views showing an entire structure of an optical unit with a shake correcting function in accordance with a second embodiment of the present invention. FIG. 18(*a*) is a perspective view showing an optical unit which is viewed from an object to be photographed side (front side in the optical axis direction) and FIG. 18(*b*) is its exploded perspective view. FIGS. 19(*a*) and 19(*b*) are exploded perspective views showing a part of an optical unit 100 with a shake correcting function in accordance with a second embodiment of the present invention. FIGS. 19(*a*) and 19(*b*) are exploded perspective views which are respectively viewed in reverse directions in an "X"-axis direction and a "Y"-axis direction. The basic structure in this embodiment is similar to the first embodiment and thus the same reference signs are used in common portions and their descriptions are omitted.

An optical unit 100 shown in FIGS. 18(*a*) and 18(*b*) is, similarly to the first embodiment, also a thin camera used in the optical device 1000 shown in FIG. 1 and is mounted in a supported state by a chassis 1100 (device main body) of the optical device 1000. As shown in FIGS. 18(*a*) and 18(*b*), flexible wiring boards 400, 410 and 450 for performing power feeding to the photographing unit 1 and the shake correcting drive mechanism are extended from the optical unit 100, and the flexible wiring boards 400, 410 and 450 are electrically connected with a host control part or the like which is provided on a main body side of the optical device 1000 through a connector (not shown) or the like. Further, the flexible wiring board 410 is also provided with a function for outputting a signal from the photographing unit 1. Therefore, the number of wirings in the flexible wiring board 410 is large and thus a wiring board having a relatively wide width is used as the flexible wiring board 410.

In the movable body 3, the photographing unit 1 includes a tube-shaped case 120 in a rectangular box shape which is made of a ferromagnetic plate such as a steel plate. An inside of the tube-shaped case 120 is arranged with a holder which holds a lens 1*a*, a cylindrical tube shaped sleeve which holds the holder, a lens drive mechanism for driving the lens 1*a* in a focusing direction, an imaging element which is disposed on a rear side in the optical axis direction, an element holder which holds the imaging element, and the like. An outer peripheral portion of the photographing unit 1 is structured of the tube-shaped case 120.

In FIGS. 18(*a*) and 18(*b*) and FIGS. 19(*a*) and 19(*b*), the optical unit 100 includes a fixed body 200, a movable body 3 including the photographing unit 1, a swing support point 180 through which the movable body 3 is set in a supported state so as to be capable of being displaced with respect to the fixed body 200, and a shake correction drive mechanism 500 which generates a magnetic drive force for relatively displacing the movable body 3 with respect to the fixed body 200 between the movable body 3 and the fixed body 200. Further, the optical unit 100 includes a spring member 600 which urges the movable body 3 toward the swing support point 180.

The fixed body 200 includes an upper cover 250, a lower cover 270 and the like. The upper cover 250 is provided with a rectangular tube shaped body part 210 surrounding the photographing unit 1 and an end plate part 220 which closes an opening part on an object to be photographed side of the rectangular tube shaped body part 210. The end plate part 220 is formed with a window 220*a* through which light from an object to be photographed is incident. The upper cover 250 is structured so that an end part of the rectangular tube shaped body part 210 on an opposite side ("+Z" side) to an object to be photographed side (side to which the optical axis "L" is extended) is formed with an open end. Further, in the rectangular tube shaped body part 210, a cut-out part 219 is formed in two side faces facing in the "X"-axis direction, and a cut-out part 218 is formed in the two side faces facing in the "Y"-axis direction. In these cut-out parts 218 and 219, the cut-out part 218 located on one side "+Y" in the "Y"-axis direction is utilized for extending the flexible wiring board 410 and the like to the outside, and other cut-out parts 218 and 219 are utilized so that the upper cover 250 and the lower cover 270 are connected with each other by adhesion, welding or the like.

The lower cover 270 is a press-formed product made of a metal plate and is provided with a substantially rectangular bottom plate part 271 and three side plate parts 272 which are stood up toward an object to be photographed side from an outer circumferential edge of the bottom plate part 271. A side of the lower cover 270 where the side plate part 272 is not formed is utilized for extending the flexible wiring board 400 and the like to the outside. A swing support point 180 is structured at a middle position of the bottom plate part 271 of the lower cover 270 and the swing support point 180 is abutted with a rear side end part in the optical axis direction of the movable body 3 to swingably support the movable body 3.

(Structure of Movable Body 3)

Figure 20:
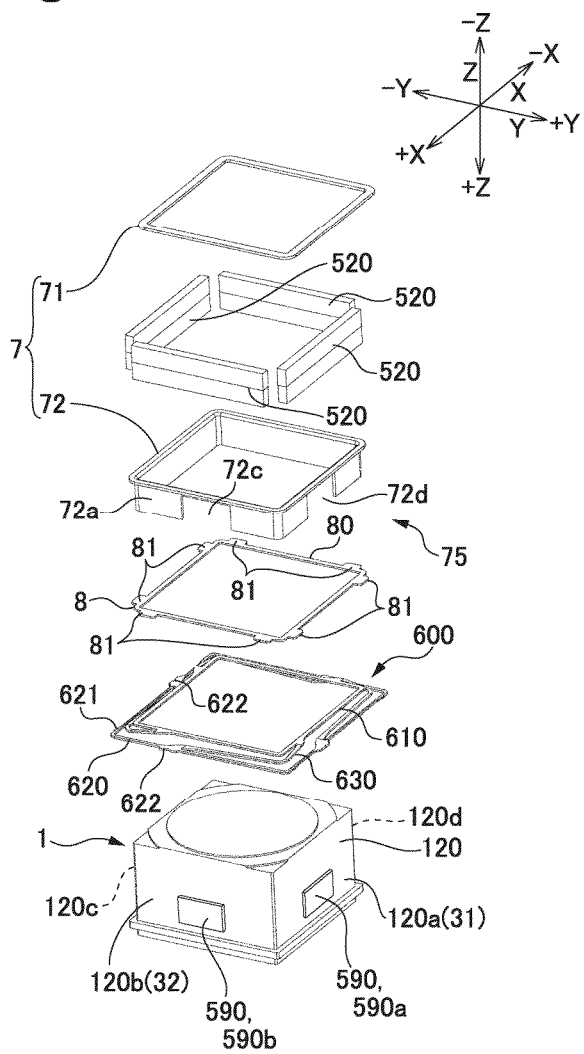
FIG. 20 is an exploded perspective view showing a movable body in an optical unit with a shake correcting function in accordance with a second embodiment of the present invention.

FIG. 20 is an exploded perspective view showing the movable body 3 in the optical unit 100 with a shake correcting function in accordance with the second embodiment of the present invention. As shown in FIGS. 18(a) and 18(b), FIGS. 19(a) and 19(b) and FIG. 20, the movable body 3 includes a photographing unit 1, a rectangular frame-shaped holder 7 which surrounds an outer peripheral face of the tube-shaped case 120 of the photographing unit 1, and a stopper member 8. The stopper member 8 is fixed to a rear side face in the optical axis direction of the holder 7 by a method of welding or the like. The holder 7 is comprised of a first holder member 71 in a rectangular frame shape which is located on a front side in the optical axis direction and a second holder member 72 in a rectangular frame shape which is located on a rear side in the optical axis direction so as to face the first holder member 71. In this embodiment, flat plate-shaped permanent magnets 520 which are used in the shake correction drive mechanism 500 are held between the first holder member 71 and the second holder member 72. Specifically, the first holder member 71 is fixed to front side faces in the optical axis direction of the permanent magnets 520 and the second holder member 72 is fixed to rear side faces in the optical axis direction of the permanent magnets 520. The permanent magnets 520, the first holder member 71 and the second holder member 72 structure a permanent magnet assembly 75 in a rectangular tube shape. Therefore, after the photographing unit 1 is inserted into an inner side of the rectangular tube-shaped permanent magnet assembly 75, an outer peripheral face of the tube-shaped case 120 of the photographing unit 1 and the inner peripheral face of the permanent magnet assembly 75 (inner faces of the permanent magnets 520) are fixed to each other by an adhesive 73 (see FIGS. 21(b) and 21(c)) or the like and, as a result, the permanent magnets 520, the first holder member 71, the second holder member 72, the stopper member 8 and the photographing unit 1 are integrated with each other to structure the movable body 3.

In this embodiment, the second holder member 72 is formed in a rectangular tube shape provided with a side plate part 72a and cut-out parts 72c and 72d are formed at an end part on a rear side in the optical axis direction of the side plate part 72a which is located on one side "+X" in the "X"-axis direction and an end part on a rear side in the optical axis direction of the side plate part 72a which is located on one side "+Y" in the "Y"-axis direction. The cut-out parts 72c and 72d are utilized as a part of an optical path for a photo reflector 580 (first photo reflector 580a and second photo reflector 580b) described below.

(Structure of Spring Member 600)

The spring member 600 is a plate-shaped spring member which is provided with a fixed body side connection part 620 in a rectangular frame shape which is connected with the fixed body 200, a movable body side connection part 610 which is connected with the movable body 3, and a plurality of arm parts 630 which are extended between the movable body side connection part 610 and the fixed body side connection part 620. Both ends of the arm part 630 are respectively connected with the movable body side connection part 610 and the fixed body side connection part 620. In this embodiment, the fixed body side connection part 620 is provided with a main body portion 621 in a rectangular frame shape and protruded parts 622 which are protruded to outer sides at middle positions of side portions of the main body portion 621.

In order to connect the spring member 600 with the movable body 3 and the fixed body 200, in this embodiment, the movable body side connection part 610 is fixed to the rear side end face in the optical axis direction of the stopper member 8 by a method such as welding. Further, the fixed body side connection part 620 is fixed to an upper end part of the side plate part 272 of the lower cover 270 by a method such as welding in a state that the protruded parts 622 are fitted to the cut-out parts 218 and 219 of the upper cover 250. The spring member 600 is made of nonmagnetic metal such as beryllium copper or nonmagnetic SUS steel material and is formed by performing press working or etching processing using a photo lithography technique on a thin plate having a certain thickness.

In this embodiment, when the movable body side connection part 610 of the spring member 600 is connected with the movable body 3 and the fixed body side connection part 620 is fixed to the fixed body 200, the movable body 3 is set in a pushed-up state to the front side in the optical axis direction by the swing support point 180. Therefore, the movable body side connection part 610 is in a pushed-up state to the front side in the optical axis direction with respect to the fixed body side connection part 620 in the spring member 600 and thus the arm parts 630 of the spring member 600 urges the movable body 3 to the rear side in the optical axis direction. Therefore, the movable body 3 is set in an urged state toward the swing support point 180 by the spring member 600 and the movable body 3 is set in a supported state by the fixed body 200 so as to be capable of being swung through the swing support point 180.

(Structure of Shake Correction Drive Mechanism)

Figure 21A:
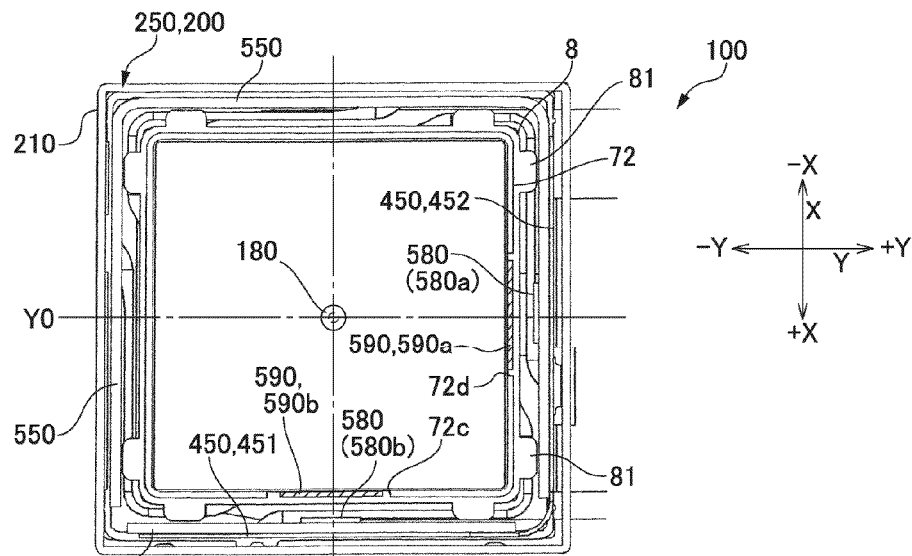
FIGS. 21(a) through 21(c) are cross-sectional views showing an optical unit with a shake correcting function in accordance with a second embodiment of the present invention.
Figure 21B:
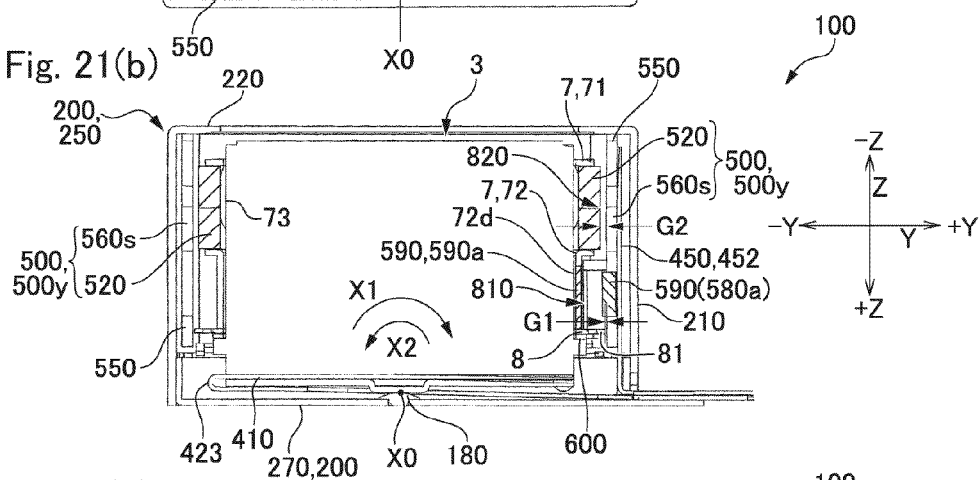
Figure 21C:
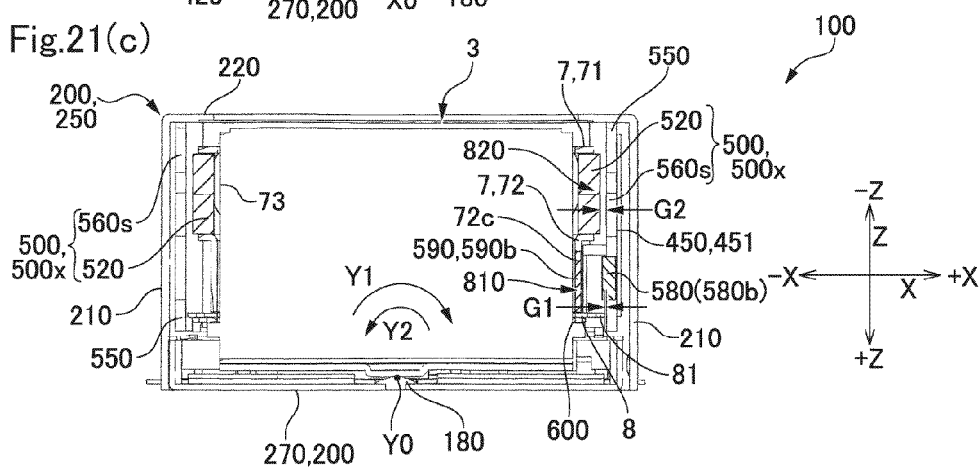
Figure 22A:
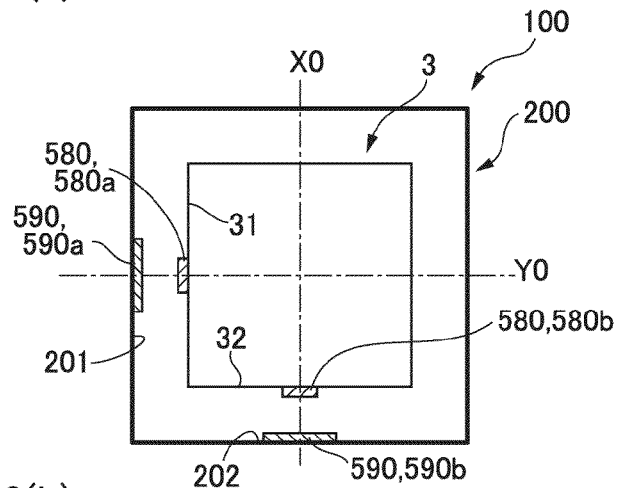
FIGS. 22(a) through 22(d) are explanatory views showing disposing positions of photo reflectors and the like in an optical unit with a shake correcting function in accordance with another embodiment of the present invention.
Figure 22B:
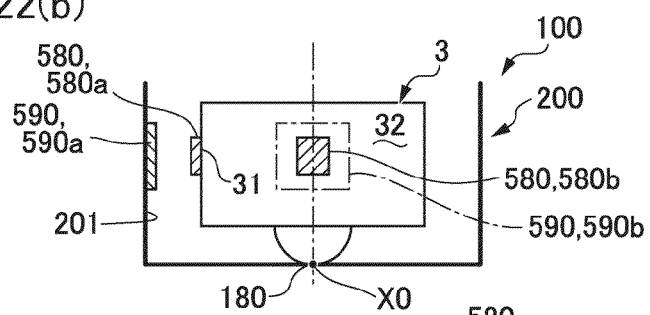
Figure 22C:
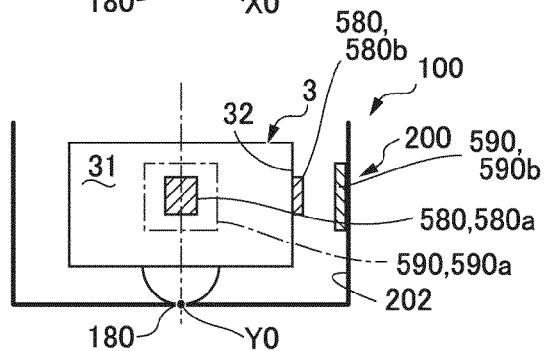
Figure 22D:
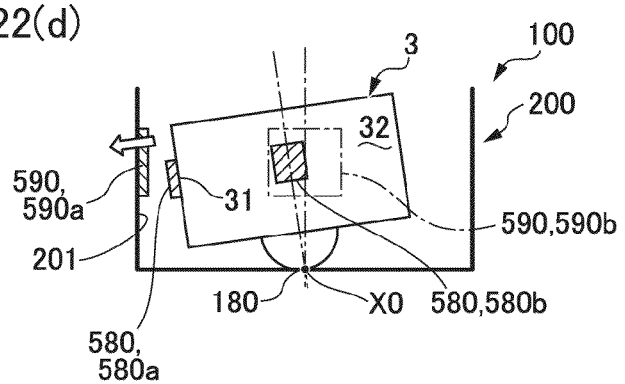
Figure 23A:
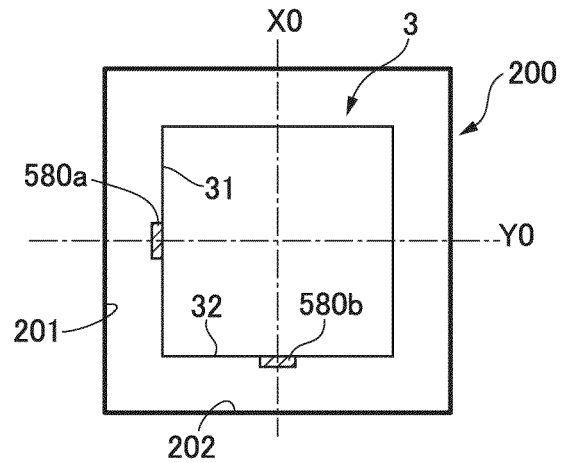
FIGS. 23(a) through 23(d) are explanatory views showing disposing positions of photo reflectors and the like in an optical unit with a shake correcting function in accordance with a reference example of at least an embodiment of the present invention.
Figure 23B:
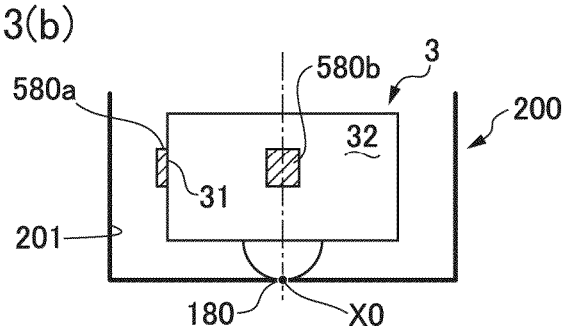
Figure 23C:
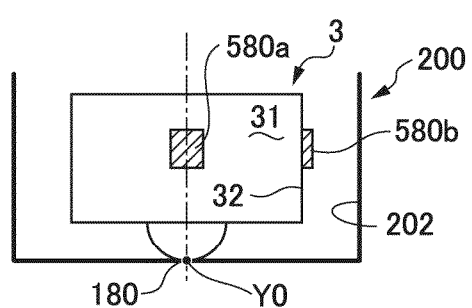
Figure 23D:
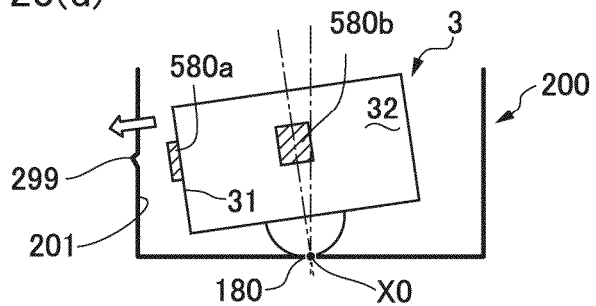
Figure 24A:
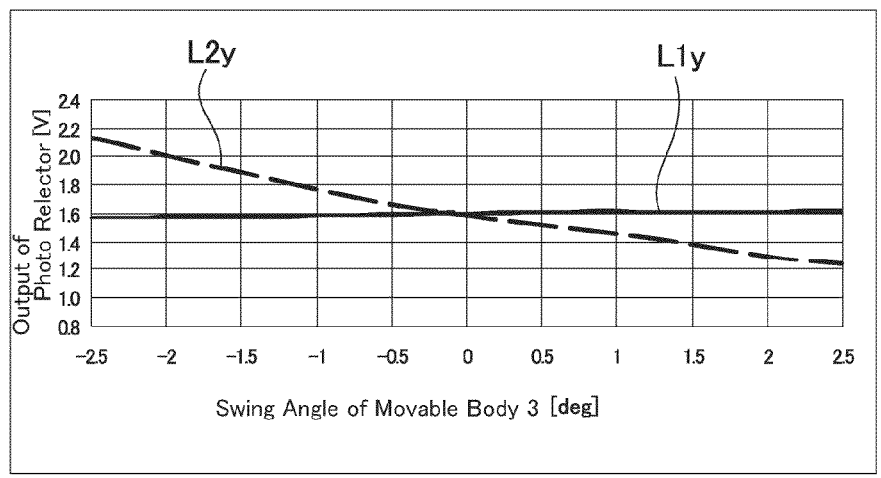
FIGS. 24(a) and 24(b) are explanatory views showing outputs from photo reflectors when a movable body is swung in an optical unit with a shake correcting function shown in FIGS. 23(a) through 23(d).
Figure 24B:
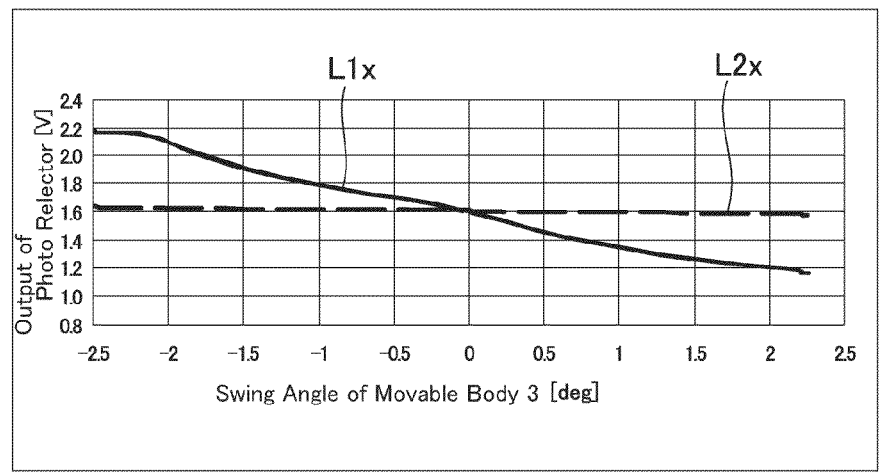
Figure 25A:
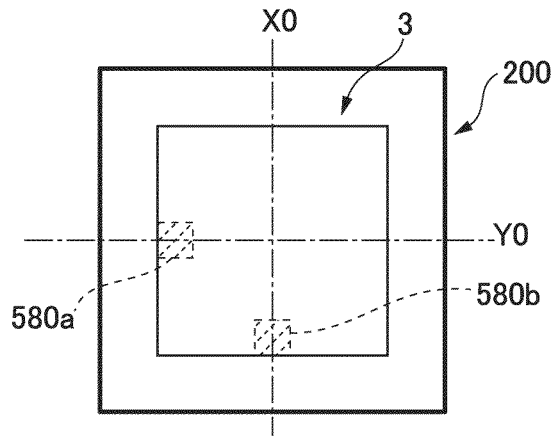
FIGS. 25(a) through 25(d) are explanatory views showing disposing positions of photo reflectors and the like in an optical unit with a shake correcting function in accordance with another reference example of at least an embodiment of the present invention.
Figure 25B:
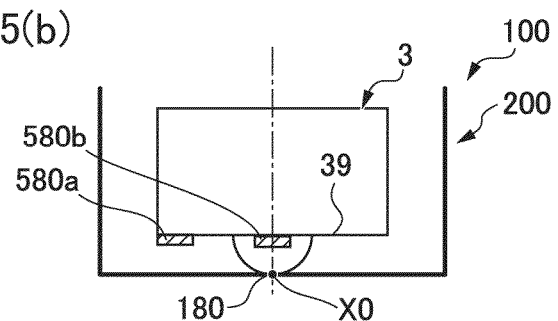
Figure 25C:
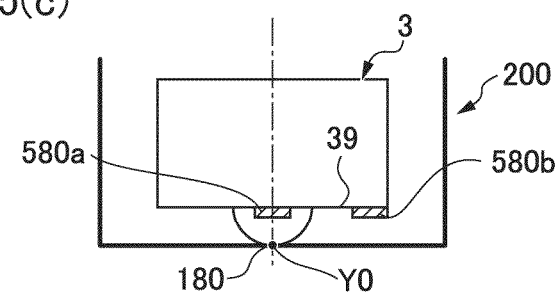
Figure 25D:
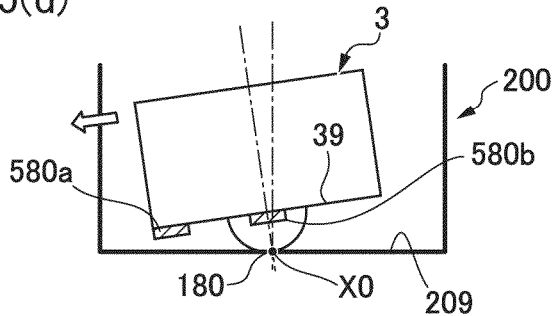

FIGS. 21(a) through 21(c) are cross-sectional views showing the optical unit 100 with a shake correcting function in accordance with the second embodiment of the present invention. FIG. 21(a) is an "XY" cross-sectional view showing the optical unit which is cut at a position passing the photo reflector 580, FIG. 21(b) is its "YZ" cross-sectional view, and FIG. 21(c) is its "XZ" cross-sectional view. In FIGS. 21(a) through 21(c), the lens holder and the like in the inside of the photographing unit are not shown.

As shown in FIGS. 19(a) and 19(b), FIG. 20 and FIGS. 21(a) through 21(c), in the optical unit 100 in this embodiment, the shake correction drive mechanism 500 is structured of coil parts 560s and the magnets 520 which generate magnetic fields interlinking with the coil parts 560s. Specifically, a flat plate-shaped magnet 520 is fixed to each of four side faces of the tube-shaped case 120 in the movable body 3 and the coil parts 560s are disposed on an inner face of the rectangular tube-shaped body part 210 of the upper cover 250.

The outer face side and the inner face side of the magnet 520 are magnetized in different poles from each other. Further, the magnet 520 is comprised of two magnet pieces which are disposed in the optical axis "L" direction and the faces of the magnet pieces facing the coil part 560s are magnetized in different poles from each other in the optical axis direction. Further, the coil part 560s is formed in a substantially quadrangular frame shape and its upper and lower long side portions are utilized as an effective side.

The magnets 520 and the coil parts 560s which are disposed at two positions interposing the movable body 3 on both sides in the "Y"-axis direction structure a "Y"-side shake correction drive mechanism 500y and, as shown by the arrows "X1" and "X2" in FIG. 21(b), the "Y"-side shake correction drive mechanism 500y swings the movable body 3 with an axial line "X0" passing through the swing support point 180 and extending in the "X"-axis direction as a swing center. Further, the magnets 520 and the coil parts 560s which are disposed at two positions interposing the photographing unit 1 on both sides in the "X"-axis direction structure an "X"-side shake correction drive mechanism 500x and, as shown by the arrows "Y1" and "Y2" in FIG. 21(c), the "X"-side shake correction drive mechanism 500x swings the movable body 3 with an axial line "Y0" passing through the swing support point 180 and extending in the "Y"-axis direction as a swing center.

In order to structure the "Y"-side shake correction drive mechanism 500y and the "X"-side shake correction drive mechanism 500x, in this embodiment, a sheet-shaped coil body 550 is used which is extended along four inner faces of the upper cover 250. In the sheet-shaped coil body 550, four coil parts 560s are integrally formed with a predetermined interval. Further, when the sheet-shaped coil body 550 is developed, the sheet-shaped coil body 550 is provided with a shape extending in a belt shape and is fixed to the inner face of the upper cover 250 by a method such as surface bonding in a state that the sheet-shaped coil body 550 is bent so as to be along the four inner faces of the upper cover 250.

The sheet-shaped coil body 550 is structured so that the coil part 560s made of a minute copper wiring line is formed on a printed circuit board by utilizing an electric conduction wiring technique. A plurality of copper wiring layers (coil part 560s) is formed in multi-layer through an insulation film. Further, the surface of the copper wiring line (coil part 560s) is covered with an insulation film. For example, an FP coil (fine pattern coil (registered mark)) made by ASAHI KASEI ELECTRONICS CO., LTD. may be used as the sheet-shaped coil body 550.

As shown in FIG. 19(a), one face 557 among four faces 556 through 559 of the sheet-shaped coil body 550 which is bent in a rectangular shape is formed with a plurality of terminal parts 565 by an electrically conducting layer extended from four coil parts 560s. In this embodiment, the terminal parts 565 are disposed on an outer side of the sheet-shaped coil body 550 which is opposite to the inner side facing the magnet 520. Further, the terminal parts 565 are electrically connected with the flexible wiring board 450, which is disposed so as to superpose on the face 557 of the sheet-shaped coil body 550 on an outer side, and the terminal parts 565 are supplied with electrical power through the flexible wiring board 450.

In this embodiment, as described above, since the sheet-shaped coil body 550 is used, in comparison with a case that discrete air-core coils are separately used, a distance between the photographing unit 1 and the fixed body 200 can be narrowed and thus the size of the optical unit 100 can be made small. Further, in the case of the sheet-shaped coil body 550, since a plurality of the coil parts 560s is integrally provided with the terminal parts 565, even when a plurality of coil parts 560s are required to be disposed around the optical axis "L", it is sufficient that the sheet-shaped coil body 550 is extended around the optical axis "L". Therefore, different from a case that discrete air-core coils are separately used, discrete air-core coils are not required to be disposed at plural positions around the optical axis "L" and discrete air-core coils are not required to be electrically connected and thus, according to this embodiment, assembly man-hours are reduced. Further, the terminal parts 565 of the sheet-shaped coil body 550 are disposed on the outer side which is an opposite side to the magnet 520 and thus electrical connection with the coil parts 560s, in other words, connection of the flexible wiring board 450 to the terminal parts 565 can be performed easily.

(Structure of Photo Reflector)

As shown in FIGS. 19(a) and 19(b), the flexible wiring board 450 is disposed in a superposed manner on an outer side of the sheet-shaped coil body 550 which is bent in a rectangular shape. The flexible wiring board 450 is provided with a first portion 451 and a second portion 452, which is bent at a right angle so as to superpose on an outer side on the face 556 on one side "+X" in the "X"-axis direction and the face 557 on one side "+Y" in the "Y"-axis direction of the sheet-shaped coil body 550. An end part 453 which is bent at a rear side end part in the optical axis direction of the second portion 452 is connected with the flexible wiring board 400 at the outside.

Respective four faces 556 through 559 of the sheet-shaped coil body 550 are formed with cut-out parts 556a, 557a, 558a and 559a at their rear side end parts in the optical axis direction. Further, the cut-out parts 556a and 557a which are formed in the face 556 on the one side "+X" in the "X"-axis direction and the face 557 on the one side "+Y" in the "Y"-axis direction are cut deeply toward the front side in the optical axis direction at a center portion in the side direction with respect to the cut-out parts 558a and 559a of the other faces 558 and 559.

Further, the photo reflectors 580 (first photo reflector 580a and second photo reflector 580b) are surface-mounted on an inner side of the second portion 452 of the flexible wiring board 450, which is superposed on the face 557 on the one side "+Y" in the "Y"-axis direction of the sheet-shaped coil body 550 on its outer side, and on an inner side of the first portion 451 which is superposed on the face 556 on the one side "+X" in the "X"-axis direction of the sheet-shaped coil body 550 on its outer side. The respective photo reflectors 580 are located within the cut-out parts 556a and 557a of the sheet-shaped coil body 550.

Therefore, when the optical unit 100 is assembled, the first photo reflector 580a is held by the face on the one side "+Y" in the "Y"-axis direction of the upper cover 250 at a position superposed in the "Z"-axis direction on the axial line "Y0" which passes the swing support point 180 and extended in the "Y"-axis direction. Further, the light emitting part and the light receiving part of the first photo reflector 580a face the first side face 31 of the movable body 3 (side face 120a of the tube-shaped case 120) through the cut-out part 72d of the second holder member 72. Further, the first photo reflector 580a is disposed between the shake correction drive mechanism 500 ("X"-side shake correction drive mechanism 500x and "Y"-side shake correction drive mechanism 500y) and the swing support point 180 in the optical axis direction. More specifically, the first photo reflector 580a is disposed between the shake correction drive mechanism 500 ("X"-side shake correction drive mechanism 500x and "Y"-side shake correction drive mechanism 500y) and the spring member 600 in the optical axis direction. Further, the first photo reflector 580a is thicker than the sheet-shaped coil body 550, and the light emitting part and the light receiving part of the first photo reflector 580*a* face the first side face 31 of the movable body 3 (side face 120*a* of the tube-shaped case 120) through a distance of about 1 mm.

Further, the second photo reflector 580*b* is held by the face located on the one side "+X" in the "X"-axis direction of the upper cover 250 at a position superposed in the "Z"-axis direction on the axial line "X0" which passes the swing support point 180 and extended in the "X"-axis direction. The light emitting part and the light receiving part of the second photo reflector 580*b* face the second side face 32 of the movable body 3 (side face 120*b* of the tube-shaped case 120) through the cut-out part 72*c* of the second holder member 72. Further, the second photo reflector 580*b* is disposed between the shake correction drive mechanism 500 ("X"-side shake correction drive mechanism 500*x* and "Y"-side shake correction drive mechanism 500*y*) and the swing support point 180 in the optical axis direction. More specifically, the second photo reflector 580*b* is disposed between the shake correction drive mechanism 500 ("X"-side shake correction drive mechanism 500*x* and "Y"-side shake correction drive mechanism 500*y*) and the spring member 600 in the optical axis direction. Further, the second photo reflector 580*b* is thicker than the sheet-shaped coil body 550, and the light emitting part and the light receiving part of the second photo reflector 580*b* face the second side face 32 of the movable body 3 (side face 120*b* of the tube-shaped case 120) through a distance of about 1 mm.

(Structure of Smooth Layer 590)

In this embodiment, the first reflective smooth layer 590*a* is superposed on the first side face 31 of the movable body 3 in a region facing the first photo reflector 580*a* and the second reflective smooth layer 590*b* is superposed on the second side face 32 of the movable body 3 in a region facing the second photo reflector 580*b*. The smooth layer 590 (first smooth layer 590*a* and second smooth layer 590*b*) is made of a resin tape, a metal sheet, coating layer, a plate-shaped glass or a reflection plate. More specifically, the smooth layer 590 is made of a resin tape, a metal sheet, a plate-shaped glass or a reflection plate, which is adhesively fixed to the movable body 3 by using adhesive material or the like, or coating layer which is cured after being coated on the movable body 3.

As described above, there is a relationship shown in FIG. 16 between a separated distance between the photo reflector 580 and the smooth layer 590 and an output current from the photo reflector 580. Therefore, according to this embodiment, the distance between the photo reflector 580 and the smooth layer 590 is about 1 mm and thus the photo reflector 580 provides a high degree of sensitivity.

Further, in a case that a separated distance between the photo reflector 580 and the reflection face is about 1 mm, when variation of the separated distance between the photo reflector 580 and the reflection face is small, an output current from the photo reflector 580 is varied in a substantially linear manner with respect to variation of the distance. Therefore, when the shake correction drive mechanism 500 ("X"-side shake correction drive mechanism 500*x* and "Y"-side shake correction drive mechanism 500*y*) is to be controlled on the basis of the output current from the photo reflector 580, the control is easily performed.

In this embodiment, the photo reflector 580 is formed in a rectangular planar shape and is provided with a short side and a long side. Further, the photo reflector 580 is provided with a center of a light emitting part on one side in its longitudinal direction and a center of a light receiving part on the other side. Further, in the photo reflector 580, a light shading part is formed between the light emitting part and the light receiving part. In order to dispose the photo reflector having the structure as described above, the longitudinal direction of the photo reflector is directed toward a direction around the optical axis. In other words, the first photo reflector 580*a* and the second photo reflector 580*b* are disposed so that the center of the light emitting part and the center of the light receiving part are arranged in a direction around the optical axis. Further, the first photo reflector 580*a* and the second photo reflector 580*b* are disposed in a reverse relation so that respective light receiving parts (centers of light receiving parts) are separated from each other. Therefore, light emitted from the first photo reflector 580*a* is hard to be received as stray light by the second photo reflector 580*b*, and light emitted from the second photo reflector 580*b* is hard to be received as stray light by the first photo reflector 580*a*.

(Structure of Stopper Mechanism)

In the optical unit 100 in this embodiment, the movable body 3 is supported by the fixed body 200 so as to be capable of swinging through the swing support point 180. Therefore, when a large force is applied to the movable body 3 from the outside and the movable body 3 is displaced largely, the arm parts 630 of the spring member 600 may be plastically deformed. In order to prevent the problem, in this embodiment, a stopper mechanism described below is provided.

In this embodiment, as described with reference to FIG. 20 and the like, the stopper member 8 in a rectangular frame shape is fixed to a rear side end face in the optical axis direction of the holder 7 in the movable body 3 by a method such as welding. The stopper member 8 is provided with a main body portion 80 in a rectangular frame shape and protruded parts 81 which are protruded from the main body portion 80 to an outer side. The protruded part 81 is protruded to an outer side with respect to the magnet 520. In this embodiment, the protruded part 81 is formed in each of four side portions of the main body portion 80. Further, the protruded part 81 is provided at two positions separated in an extended direction of the side in each of four side portions of the main body portion 80 and, in this embodiment, the protruded part 81 is provided in the vicinity of both ends of each of four side portions of the main body portion 80 (near to corners of the main body portion 80).

In this embodiment, the protruded part 81 faces a lower end portion 555 of the sheet-shaped coil body 550 (see FIGS. 19(*a*) and 19(*b*)) which is provided on the fixed body 200 on both sides in the "X"-axis direction and both sides in the "Y"-axis direction through a narrow gap "G1" (see FIGS. 21(*b*) and 21(*c*)). Therefore, the protruded part 81 and the sheet-shaped coil body 550 structure a stopper mechanism 810, which determines a movable range when the movable body 3 is displaced in a direction perpendicular to the optical axis direction, between the shake correction drive mechanism 500 and the swing support point 180 in the optical axis direction. More specifically, the protruded part 81 and the sheet-shaped coil body 550 structure a stopper mechanism 810, which determines a movable range when the movable body 3 is displaced in a direction perpendicular to the optical axis direction, between the shake correction drive mechanism 500 and the swing support point 180 in the optical axis direction, in other words, between the shake correction drive mechanism 500 and the spring member 600.

In the case of the sheet-shaped coil body 550, different from an air-core coil, winding is not loosened even when the sheet-shaped coil body 550 is abutted with the magnet 520. Therefore, the portion with which the protruded part 81 is abutted may be a portion where the coil part 560*s* is structured or a portion where the coil part 560*s* is not structured in the sheet-shaped coil body 550. However, in this embodiment, the portion with which protruded part 81 is abutted is set in a portion where the coil part 560s is not structured in the sheet-shaped coil body 550.

Further, the sheet-shaped coil body 550 and the magnet 520 face each other through a narrow gap "G2" and the gap "G2" is slightly larger than the gap "G1" between the protruded part 81 and the sheet-shaped coil body 550. Therefore, the sheet-shaped coil body 550 and the magnet 520 structure a stopper mechanism 820 which determines a swing range when the movable body 3 is swung. The portion with which the magnet 520 is abutted may be a portion where the coil part 560s is structured or a portion where the coil part 560s is not structured in the sheet-shaped coil body 550. However, in this embodiment, the portion with which the magnet 520 is abutted is set in a portion where the coil part 560s is structured in the sheet-shaped coil body 550. According to the stopper mechanism 820, a swing range of the movable body 3 is set with a high degree of accuracy. In other words, in the shake correction drive mechanism 500, a distance between the sheet-shaped coil body 550 and the magnet 520 is set with a high degree of accuracy and thus, when the stopper mechanism 820 is structured by utilizing the sheet-shaped coil body 550 and the magnet 520, a swing range of the movable body 3 is set with a high degree of accuracy.

As described above, in this embodiment, the stopper mechanism 810 is provided in which the protruded part 81 protruded from one of the fixed body 200 and the movable body 3 is abutted with the other side to determine a movable range when the movable body 3 is displaced in a direction perpendicular to the optical axis direction. More specifically, in this embodiment, the stopper mechanism 810 is provided in which the protruded part 81 protruded from the movable body 3 is abutted with the fixed body 200 to determine a movable range when the movable body 3 is displaced in a direction perpendicular to the optical axis direction. Therefore, even when the movable body 3 is displaced in a direction perpendicular to the optical axis direction due to an impact applied to the movable body 3, a movable range of the movable body 3 is restricted. Accordingly, the spring member 600 is prevented from being plastically deformed and damaged. Further, the protruded part 81 (stopper mechanism 810) is provided between the shake correction drive mechanism 500 and the swing support point 180 in the optical axis direction and thus the stopper mechanism 810 is operated with little displacement of the movable body 3. Therefore, plastic deformation of the spring member 600 is prevented surely. Further, the protruded part 81 (stopper mechanism 810) is provided between the shake correction drive mechanism 500 and the spring member 600 in the optical axis direction. Therefore, a movable range is restricted further narrow when the movable body 3 is displaced in a direction perpendicular to the optical axis direction and thus plastic deformation of the spring member 600 is prevented further surely.

Further, the protruded part 81 is protruded from the movable body 3 toward the sheet-shaped coil body 550 side more than the magnet 520 to be abutted with the sheet-shaped coil body 550. Therefore, a movable range when the movable body 3 is displaced in a direction perpendicular to the optical axis direction can be set with a high degree of accuracy and thus the movable range when the movable body 3 is displaced in a direction perpendicular to the optical axis direction can be restricted without disturbing swing of the movable body 3. In other words, in the shake correction drive mechanism 500, a distance between the sheet-shaped coil body 550 and the magnet 520 is set with a high degree of accuracy and thus, when it is structured that the protruded part 81 is to be abutted with the sheet-shaped coil body 550, the distance between the protruded part 81 and the sheet-shaped coil body 550 is set with a high degree of accuracy. Therefore, a movable range when the movable body 3 is displaced in a direction perpendicular to the optical axis direction can be set with a high degree of accuracy.

Further, the movable body 3 includes the frame-shaped holder 7 which holds the magnets 520 and the frame-shaped stopper member 8 which is provided with the protruded parts 81 and fixed to the rear side end face in the optical axis direction of the holder 7. Therefore, the magnet 520 can be magnetized in the state that the magnet 520 is fixed to the holder 7 and thus handling of the magnet 520 is easy. Further, the holder 7 and the stopper member 8 are structured in a separated manner and thus, a magnetizing step can be performed in a state before the stopper member 8 is fixed to the holder 7. Therefore, when the magnetizing step is to be performed, the protruded part 81 structuring the stopper mechanism 810 does not disturb.

Further, a connected portion of the spring member 600 with the movable body 3 side is the stopper member 8. Therefore, the spring member 600 is connected with the stopper member 8 which is fixed with a high degree of accuracy and thus the spring constant of the spring member 600 can be set with a high degree of accuracy.

Further, the protruded part 81 is provided at two positions separated from each other in each of four sides of a quadrangular shape. Therefore, when the stopper mechanism 810 is operated, a force in a twisting direction is not applied to the movable body 3 and thus plastic deformation in the twisting direction is prevented from being occurred in the spring member 600.

(Shake Correcting Operation)

In the optical unit 100 in this embodiment, when the optical device 1000 shown in FIG. 1 is shaken, the shake is detected by a gyroscope and a host control section controls the shake correction drive mechanism 500 based on a detection result by the gyroscope. In other words, a drive current for cancelling the shake which is detected by the gyroscope is supplied to the coil parts 560s of the sheet-shaped coil body 550 through the flexible circuit board 400 and the flexible circuit board 450. As a result, the "X"-side shake correction drive mechanism 500x swings the photographing unit 1 around the axial line "Y0" with the swing support point 180 as a swing center. Further, the "Y"-side shake correction drive mechanism 500y swings the photographing unit 1 around the axial line "X0" with the swing support point 180 as the swing center. Further, when the swing around the axial line "X0" and the swing around the axial line "Y0" of the photographing unit 1 are combined with each other, the photographing unit 1 is displaced over the entire "X-Y" plane. Accordingly, all shakes occurred in the optical unit 100 can be corrected surely.

When the photographing unit 1 is driven as described above, displacement of the photographing unit 1 is monitored by the photo reflectors 580 shown in FIGS. 21(*a*) through 21(*c*). In this case, also in the fixed body 200 and the movable body 3 in this embodiment, similarly to the first embodiment, the reflective smooth layer 590 (first smooth layer 590*a* and second smooth layer 590*b*) is superposed in a region facing the photo reflector 580 (first photo reflector 580*a* and second photo reflector 580*b*) and thus, even when the movable body 3 is swung, the photo reflector 580 always faces the smooth layer 590. Therefore, even when there is a scratch or the like in a region facing the photo reflector 580, the scratch is covered by the reflective smooth layer 590 and thus appropriate reflected light is always returned to the photo reflector 580. Accordingly, even when the photo reflector 580 is provided by utilizing a space between the side face of the movable body 3 and the side face of the fixed body 200, appropriate correlation can be obtained between an output from the photo reflector 580 and a swing angle of the movable body 3 and a swing of the movable body 3 can be monitored with a high degree of accuracy. Therefore, a swing of the movable body 3 can be controlled with a high degree of accuracy.

(Structure of Flexible Wiring Board 410)

As shown in FIGS. 18(*a*) and 18(*b*) and the like, in the optical unit 100 in this embodiment, one end part of the flexible circuit board 410 is connected with the photographing unit 1 of the movable body 3. Therefore, when the flexible circuit board 410 applies a load to the movable body 3 at the time of swinging of the movable body 3, an appropriate swing of the movable body 3 may be obstructed.

In order to prevent this problem, a main body portion of the flexible wiring board 410 which is located on an outer side of the optical unit 100 is formed in a wide width. However, a portion of the flexible circuit board 410 which is located on an inner side of the optical unit 100 is formed in two strip-shaped portions whose width dimension is narrow. Therefore, there is no problem to make the swing support point 180 abut with the movable body 3. Further, a portion of the flexible circuit board 410 which is located on the inner side of the optical unit 100 is formed to be two strip-shaped portions whose width dimension is narrow and thus the rigidity of the strip-shaped portion is relaxed. Therefore, the strip-shaped portion of the flexible circuit board 410 is capable of following a shake of the movable body 3 smoothly and thus a large load is not applied to the movable body 3.

Further, as shown in FIG. 21(*b*), the flexible wiring board 410 is extended from one side "+Y" in the "Y"-axis direction toward the other side "−Y" and then, the flexible wiring board 410 is folded back toward the one side "+Y" between the movable body 3 and the lower cover 270 and, after that, its end part is fixed to the movable body 3. Therefore, since the flexible circuit board 410 is provided with the folded-back portion 413 between the outside and the portion fixed to the movable body 3 and thus its dimension is long. Therefore, the strip-shaped portion of the flexible circuit board 410 is capable of following a shake of the photographing unit 1 smoothly and thus a large load is not applied to the movable body 3. Further, the folded-back portion 413 of the flexible circuit board 410 is located at the same height position as the swing center of the movable body 3 in the swing support point 180. Therefore, when the movable body 3 is swung, the displacement of the flexible wiring board 410 is restrained small. Accordingly, affection of the flexible circuit board 410 applied to the movable body 3 is reduced and thus, the movable body 3 is swung with a high degree of accuracy.

(Principal Effects in this Embodiment)

As described above, in the optical unit 100 in this embodiment (optical unit with a shake correcting function), the movable body 3 is swingably supported through the swing support point 180 of the fixed body 200 and thus, when the shake correction drive mechanism 500 is operated, the movable body 3 can be swung with the swing support point 180 as a swing center. Therefore, even when a shake is occurred in the optical unit 100 due to a shake of hand or the like, the shake can be corrected by swinging of the movable body 3.

Further, in the fixed body 200 and the movable body 3, the reflective smooth layer 590 (first smooth layer 590*a* and second smooth layer 590*b*) is superposed in a region facing the photo reflector 580 (first photo reflector 580*a* and second photo reflector 580*b*) and thus, even when the movable body 3 is swung, the photo reflector 580 always faces the smooth layer 590. Therefore, even when there is a scratch or the like in a region facing the photo reflector 580, the scratch is covered by the reflective smooth layer 590 and thus appropriate reflected light is always returned to the photo reflector 580. Accordingly, even when the photo reflector 580 is provided by utilizing a space between the side face of the movable body 3 and the side face of the fixed body 200, appropriate correlation can be obtained between an output from the photo reflector 580 and a swing angle of the movable body 3 and thus a swing of the movable body 3 can be monitored with a high degree of accuracy. Therefore, a swing of the movable body 3 can be controlled with a high degree of accuracy.

Further, the smooth layer 590 is superposed on the flat side face (flat face) of the movable body 3 and thus the smooth layer 590 is flatly superposed by only superposing the smooth layer 590 on the surface of the magnet 520.

From a viewpoint that the shake correction drive mechanism 500 swings the movable body 3 with a sufficient torque, it is preferable that the shake correction drive mechanism 500 is separated from the swing support point 180 in the optical axis direction. Further, judging from a viewpoint of linearity between distance and output of the photo reflector 580, it is preferable that detection is performed under a condition that displacing amount is to some extent small. In this embodiment, the photo reflector 580 is provided between the shake correction drive mechanism 500 and the swing support point 180 which are provided at separated positions in the optical axis direction. Therefore, the shake correction drive mechanism 500 can be provided at a separated position from the swing support point 180 in the optical axis direction and thus, the photo reflector 580 can be provided at a position where displacement of the movable body 3 is relatively small. As a result, according to this embodiment, even when the size of the optical unit 100 is small, both of the shake correction drive mechanism 500 and the photo reflector 580 can be disposed appropriately.

Further, the photo reflector 580 is provided between the shake correction drive mechanism 500 and the swing support point 180 which are provided at separated positions in the optical axis direction and thus the shake correction drive mechanism 500 and the photo reflector 580 do not face each other. Therefore, even when the photo reflector 580 is thicker than the sheet-shaped coil body 550 and is protruded to an inner peripheral side with respect to the sheet-shaped coil body 550, a portion facing the photo reflector 580 is not the shake correction drive mechanism 500 and thus a space in the shake correction drive mechanism 500 is not required to be widened and the size of the device can be prevented from being increased.

[Other Embodiments]

FIGS. 22(*a*) through 22(*d*) are explanatory views showing disposing positions of the photo reflectors 580 and the like in the optical unit 100 with a shake correcting function in accordance with another embodiment of the present invention. FIG. 22(*a*) is an explanatory view showing a planar structure of the optical unit 100, FIG. 22(*b*) is an explanatory view schematically showing the "YZ" cross section, FIG. 22(*c*) is an explanatory view schematically showing the "XZ" cross section, and FIG. 22(*d*) is an explanatory view schematically showing a state that the movable body 3 is swung. FIGS. 22(*a*) through 22(*d*) are views corresponding to FIGS. 2(*a*) through 2(*d*) and the shake correction drive mechanism is not shown. The basic structure in this embodiment is similar to the above-mentioned embodiments and thus the same reference signs are used in common portions and their descriptions are omitted.

In the first and the second embodiments described above, the photo reflector 580 is provided on the fixed body 200 side but, as shown in FIGS. 22(a) through 22(d), the photo reflector 580 may be provided on the movable body 3 side. In this case, the smooth layer 590 is provided on the fixed body 200 side.

[Other Structural Examples of Optical Unit 100]

In the embodiments described above, the present invention is, as an example, applied to the optical unit 100 which is used in a cell phone with a camera. However, at least an embodiment of the present invention may be applied to the optical unit 100 which is used in a thin digital camera or the like. Further, in the embodiment described above, a lens drive mechanism and the like are structured in the photographing unit 1. However, at least an embodiment of the present invention may be applied to a fixed focus type optical unit in which the lens drive mechanism is not mounted on the photographing unit 1.

In addition, other than a cell phone, a digital camera and the like, the optical unit 100 with a shake correcting function to which at least an embodiment of the present invention is applied may be fixed and mounted in an apparatus such as a refrigerator in which vibration is occurred in a certain interval so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and a direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
   a fixed body;
   a movable body which holds an optical element;
   a shake correction drive mechanism structured to swing the movable body in a first direction intersecting an optical axis direction and in a second direction intersecting the optical axis direction and the first direction;
   a first photo reflector which is provided on a first side face that is one of a first side face of the fixed body and a first side face of the movable body facing each other in the first direction, the first photo reflector being directed to the other of the first side face of the fixed body and the first side face of the movable body;
   a first reflective smooth layer which is superposed on the other of the first side faces in a region facing the first photo reflector;
   a second photo reflector which is provided on a second side face that is one of a second side face of the fixed body and a second side face of the movable body facing each other in the second direction, the second photo reflector being directed to the other of the second side face of the fixed body and the second side face of the movable body; and
   a second reflective smooth layer which is superposed on the other of the second side faces in a region facing the second photo reflector.

2. The optical unit with a shake correcting function according to claim 1, wherein each of the first smooth layer and the second smooth layer is made of one of a resin tape, a metal sheet, coating layer, a plate-shaped glass and a reflection plate.

3. The optical unit with a shake correcting function according to claim 2, wherein each of the first smooth layer and the second smooth layer is superposed on a flat face.

4. The optical unit with a shake correcting function according to claim 3, wherein
   the first photo reflector and the second photo reflector are provided on the fixed body, and
   the first smooth layer and the second smooth layer are provided on the movable body.

5. The optical unit with a shake correcting function according to claim 1, wherein
   the shake correction drive mechanism includes a first air-core coil provided on the first side face of the fixed body, a first magnet provided on the first side face of the movable body, a second air-core coil provided on the second side face of the fixed body, and a second magnet provided on the second side face of the movable body, the first photo reflector is provided in an inner side region of the first air-core coil, the second photo reflector is provided in an inner side region of the second air-core coil, the first smooth layer is superposed on a face of the first magnet on a side where the first air-core coil is located, and the second smooth layer is superposed on a face of the second magnet on a side where the second air-core coil is located.

6. The optical unit with a shake correcting function according to claim 5, wherein the first photo reflector is provided at a position displaced to a side where the first magnet is located with respect to a back face of the first air-core coil in the inner side region of the first air-core coil, and the second photo reflector is provided at a position displaced to a side where the second magnet is located with respect to a back face of the second air-core coil in the inner side region of the second air-core coil.

7. The optical unit with a shake correcting function according to claim 1, wherein the shake correction drive mechanism includes a first coil provided on the first side face of the fixed body, a first magnet provided on the first side face of the movable body, a second coil provided on the second side face of the fixed body, and a second magnet provided on the second side face of the movable body, and the first photo reflector, the first smooth layer, the second photo reflector and the second smooth layer are provided on a side where a swing center of the movable body is located in the optical axis direction with respect to the first coil, the first magnet, the second coil and the second magnet.

8. The optical unit with a shake correcting function according to claim 4, further comprising a swing support point which supports a rear side end part in the optical axis direction of the movable body so that the movable body is capable of swinging in the first direction and the second direction.

9. The optical unit with a shake correcting function according to claim 5, wherein the movable body comprises a tube-shaped case in a rectangular tube shape having the first side face and the second side face, and respective four side faces of the tube-shaped case are fixed with four magnets including the first magnet and the second magnet which structure the shake correction drive mechanism, the fixed body comprises a rectangular tube shaped body part having the first side face and the second side face which surrounds the movable body, a flexible wiring board is provided on an inner side of the rectangular tube shaped body part by which the flexible wiring board is held in a rectangular bent state, four air-core coils including the first air-core coil and the second air-core coil are mounted on an inner face of the flexible wiring board at four positions separated from each other so as to face the four magnets, and the first photo reflector and the second photo reflector are mounted on the inner face of the flexible wiring board.

10. The optical unit with a shake correcting function according to claim 9, wherein portions of the flexible wiring board where the first photo reflector and the second photo reflector are mounted are formed as a thin width portion, and the thin width portion is bent from the flexible wiring board on which the first air-core coil and the second air-core coil are mounted to a side where the movable body is located and thereby, the first photo reflector is provided at a position displaced to the side where the first magnet is located with respect to a back face of the first air-core coil, and the second photo reflector is provided at a position displaced to the side where the second magnet is located with respect to a back face of the second air-core coil.

11. The optical unit with a shake correcting function according to claim 10, wherein each of the first smooth layer and the second smooth layer is made of one of a resin tape, a metal sheet, coating layer, a plate-shaped glass and a reflecting plate.

12. The optical unit with a shake correcting function according to claim 11, wherein the first smooth layer is superposed on a flat face of the first magnet which faces the inner side region of the first air-core coil, and the second smooth layer is superposed on a flat face of the second magnet which faces the inner side region of the second air-core coil.

13. The optical unit with a shake correcting function according to claim 12, further comprising a swing support point which supports a rear side end part in the optical axis direction of the movable body so that the movable body is capable of swinging in the first direction and the second direction.

14. The optical unit with a shake correcting function according to claim 13, further comprising a spring member which supports the movable body so as to be capable of being displaced with respect to the fixed body, wherein the spring member is a plate-shaped spring member which is provided with a fixed body side connection part fixed to a lower end part of the fixed body, a movable body side connection part connected with the movable body, and a plurality of arm parts which are extended between the movable body side connection part and the fixed body side connection part.

15. The optical unit with a shake correcting function according to claim 7, wherein the movable body comprises a tube-shaped case in a rectangular tube shape having the first side face and the second side face, and respective four side faces of the tube-shaped case are fixed with four magnets including the first magnet and the second magnet which structure the shake correction drive mechanism, the fixed body comprises a rectangular tube shaped body part having the first side face and the second side face which surrounds the movable body, a sheet-shaped coil body which structures the shake correction drive mechanism is provided so as to extend along four inner faces of the rectangular tube shaped body part of the fixed body, and the sheet-shaped coil body is integrally formed with four coil parts including the first coil and the second coil so as to be respectively disposed on the four inner faces of the rectangular tube shaped body part.

16. The optical unit with a shake correcting function according to claim 15, wherein the sheet-shaped coil body is formed with a cut-out part at a rear side end part in the optical axis direction, a flexible wiring board is disposed on an outer side of the sheet-shaped coil body in a superposed manner, the first photo reflector and the second photo reflector are mounted on the flexible wiring board so as to be located in the cut-out part provided in the sheet-shaped coil body, the first smooth layer is superposed on the first side face of the movable body in a region facing the first photo reflector on a rear side in the optical axis direction with respect to the first magnet, and the second smooth layer is superposed on the second side face of the movable body in a region facing the second photo reflector on a rear side in the optical axis direction with respect to the second magnet.

17. The optical unit with a shake correcting function according to claim 16, wherein each of the first smooth layer and the second smooth layer is made of one of a resin tape, a metal sheet, coating layer, a plate-shaped glass and a reflecting plate.

18. The optical unit with a shake correcting function according to claim 17, further comprising a spring member which supports the movable body so as to be capable of being displaced with respect to the fixed body, wherein the spring member is a plate-shaped spring member which is provided with a fixed body side connection part fixed to a lower end part of the fixed body, a movable body side connection part connected with the movable body, and a plurality of arm parts which are extended between the movable body side connection part and the fixed body side connection part.

19. The optical unit with a shake correcting function according to claim 18, further comprising a swing support point which supports a rear side end part in the optical axis direction of the movable body so that the movable body is capable of swinging in the first direction and the second direction.

* * * * *